United States Patent
Tan et al.

(10) Patent No.: US 7,714,945 B2
(45) Date of Patent: May 11, 2010

(54) OPTIMALLY CLOCKED TRIM RETARDERS

(75) Inventors: Kim Leong Tan, Santa Rosa, CA (US);
Anthony James Mache, Jr., Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 801 days.

(21) Appl. No.: 11/468,860

(22) Filed: Aug. 31, 2006

(65) Prior Publication Data
US 2007/0064163 A1   Mar. 22, 2007

Related U.S. Application Data

(60) Provisional application No. 60/715,829, filed on Sep. 9, 2005, provisional application No. 60/737,113, filed on Nov. 16, 2005.

(51) Int. Cl.
*G02F 1/13363* (2006.01)
*G02F 1/139* (2006.01)
*H04N 9/31* (2006.01)

(52) U.S. Cl. ............................. 349/8; 349/96; 349/117; 349/178

(58) Field of Classification Search ..................... 349/5, 349/8, 96, 102, 117, 118, 119, 178; 353/20, 353/31; 359/486, 494, 500
See application file for complete search history.

(56) References Cited

U.S. PATENT DOCUMENTS

| | | | |
|---|---|---|---|
| 2,478,385 A | 8/1949 | Gaiser | 359/580 |
| 3,185,020 A | 5/1965 | Thelen | 359/586 |
| 3,463,574 A | 8/1969 | Bastien et al. | 359/588 |
| 3,565,509 A | 2/1971 | Sulzbach | 359/588 |
| 3,604,784 A | 9/1971 | Louderback et al. | 350/164 |
| 3,781,090 A | 12/1973 | Sumita | 350/164 |
| 3,799,653 A | 3/1974 | Ikeda | 350/164 |
| 3,822,926 A | 7/1974 | Dalbera et al. | 359/586 |
| 3,936,136 A | 2/1976 | Ikeda et al. | 350/1 |
| 4,313,647 A | 2/1982 | Takazawa | 350/164 |
| 4,666,250 A | 5/1987 | Southwell | 359/586 |
| 5,142,393 A | 8/1992 | Okumura et al. | 349/121 |

(Continued)

FOREIGN PATENT DOCUMENTS

EP     0621499     10/1994

(Continued)

OTHER PUBLICATIONS

"P-155; High Performance Contrast Enhancing Films for VAN-Mode LCoS Panels" by Duelli et al.; 2005 SID International Symposium, Boston, MA; May 24-27, 2005, SID 05 Digest, pp. 892-895.

(Continued)

*Primary Examiner*—Dung Nguyen
*Assistant Examiner*—Tai Duong
(74) *Attorney, Agent, or Firm*—Matthew A. Pequignot; Pequignot + Myers LLC

(57) ABSTRACT

A trim retarder for a liquid crystal display based projection system including a light source, a polarizer/analyzer, a liquid crystal display panel, and a projection lens, is clocked to an optimal azimuthal angle that provides a system contrast level substantially unaffected by the orientation of the slow axis of the liquid crystal display panel.

35 Claims, 27 Drawing Sheets

U.S. PATENT DOCUMENTS

| | | | |
|---|---|---|---|
| 5,184,237 A | 2/1993 | Iimura et al. | 349/119 |
| 5,196,953 A | 3/1993 | Yeh et al. | 349/119 |
| 5,220,447 A | 6/1993 | Yokokura et al. | 349/119 |
| 5,375,006 A | 12/1994 | Haas et al. | 359/73 |
| 5,490,006 A | 2/1996 | Masumoto et al. | 349/117 |
| 5,688,566 A | 11/1997 | Broer et al. | 428/1.31 |
| 5,777,709 A | 7/1998 | Xu | 349/120 |
| 5,798,808 A | 8/1998 | Van Haaren et al. | 349/96 |
| 5,895,106 A | 4/1999 | VanderPloeg et al. | 349/120 |
| 5,986,733 A | 11/1999 | Winker et al. | 349/120 |
| 6,057,901 A | 5/2000 | Xu | 349/121 |
| 6,175,400 B1 | 1/2001 | Duncan et al. | 349/117 |
| 6,356,325 B1 | 3/2002 | Shimoshikiryo | 349/121 |
| 6,556,266 B1 | 4/2003 | Shirochi et al. | 349/118 |
| 6,585,378 B2 | 7/2003 | Kurtz et al. | 353/31 |
| 6,587,171 B1 | 7/2003 | Georges et al. | 349/120 |
| 6,590,707 B1 | 7/2003 | Weber | 359/498 |
| 6,805,445 B2 | 10/2004 | Silverstein et al. | 353/20 |
| 6,805,924 B1 | 10/2004 | Ishikawa et al. | 428/1.1 |
| 6,829,027 B2 * | 12/2004 | McKnight | 349/121 |
| 6,857,747 B2 | 2/2005 | Pentico et al. | 353/31 |
| 6,885,422 B2 | 4/2005 | Suzuki et al. | 349/121 |
| 6,909,473 B2 | 6/2005 | Mi et al. | 349/5 |
| 6,912,030 B1 | 6/2005 | Coates | 349/119 |
| 7,079,209 B2 | 7/2006 | Nakagawa | 349/119 |
| 2002/0047968 A1 | 4/2002 | Yoshida et al. | 349/117 |
| 2004/0114079 A1 | 6/2004 | Kurtz et al. | 349/117 |
| 2005/0128380 A1 | 6/2005 | Zieba et al. | 349/96 |
| 2005/0128391 A1 | 6/2005 | Tan et al. | 349/117 |

FOREIGN PATENT DOCUMENTS

| | | |
|---|---|---|
| EP | 1542044 | 6/2005 |

OTHER PUBLICATIONS

"28.3: General Methodology for LCoS Panel Comepnsation" by Chen et al.; .; 2004 SID International Symposium, Seattle, WA; May 25-27, 2004, SID 04 Digest, pp. 990-993.

"Ultra High Contrast Color Management System for Projection Displays" by Pentico et al.; SID International Symposium, vol. 34, 2003, SID 03 Digest, pp. 130-133.

X.J. Yu et al., "Optical wire-grid polarizers at oblique angles of incidence," J. Appl. Phys. 93(8), Apr. 15, 2003, pp. 4407-4412.

S-Y. Lu and R. Chipman, "Interpretation of Mueller matrices based on polar decomposition," J. Opt. Soc. Am., 13, pp. 1106-1113, 1996.

U.S. Appl. No. 11/419,872, filed May 23, 2006, Tan et al.

J. E. Anderson et al. "Fast VAN LCoS Microdisplay," SID 05 Digest, pp. 1366-1369, 2005.

S. Hashimoto et al. "SXRD (Silicon X-tal Reflective Display): A new display device for projection displays," SID 05 Digest, pp. 1362-1365, 2005.

Sergan et al. "Measurement and modeling of optical performance of wire grids and liquid-crystal displays utilizing grid polarizers," J. Opt. Soc. Am. A, 19(9), p. 1872, 2002.

J. Chen, M.G. Robinson, D.A. Coleman, and G.D. Sharp, "Impact of the Orientation of Panel Pretilt Directional and Quarter-wave Plate on LCoS Projection System Contrast," SID 06, Digest, pp. 1606-1609, 2006.

J. Chen, "Impact of the Orientation of Panel Pretilt Direction and Quarter Wave Plate on LCOS Projection System Contrast", Boulder, Colorado, pp. 1-5.

"Achromatic phase retarder by slanted illumincation of a dielectric grating with period comparable with the wavelength", Bokor et al, Applied Optics, vol. 40, No. 13, May 1, 2001; pp. 2076-2080.

"Mechanism of shape formation of three-dimensional periodic nanostructures by bias sputtering", Kawakami et al, Applied Physics Ltrs, vol. 74, No. 8, Jan. 18, 1999, pp. 463-465.

"Photonic crystals for the visible range fabricated by autocloning technique and their application", Sato et al, Optical and Quantum Electronics 34: pp. 63-70, 2002.

"Design and Characterization of a compensator for high contrast LcoS projection systems", Tan et al, SID 05 Digest, pp. 1-4, 2005.

H. Seiberle, K. Schmitt and M. Schadt, "Multidomain LCDs and Complex Optical Retarders Generated by Photo-alignment," Proc. Eurodisplays '99, pp. 6-9, Sep. 1999.

"Birefringent Compensators for Normally White TN-LCD's", Eblen J.P. et al, Society for Information Display, SID International Papers, San Jose, Jun. 14-16, 1994; Santa Ana SID, U.S. vol. 25, Jun. 14, 1994, pp. 245-248, XP000462707, Chapter, Design.

H. Mori, et al., "Novel optical compensation method based upon a discotic optical compensation film for wide-viewing-angle LCDs," SID 03 Digest, p. 1058, 2003.

D. Hansen, E. Gardner, R. Perkins, M. Lines, and A. Robbins, "The display applications and physics of the Proflux wire grid polarizer," SID 02 Digest, p. 730, 2002.

D. Anderson and K. Shahzad, "Off-axis LCoS compensation for enhanced contrast," SID 03 Digest, pp. 1433-1435, 2003.

K. Tan et al., "Design and characterization of a compensator for high contrast LCoS projection systems," SID 2005, p. 1810, 2005.

Karen Hendrix et al., "Birefringent Films for Contrast Enhancement of Liquid Crystal on Silicon Projection Systems", Journal of Vacuum Science and Technology A. Vacuum, Surfaces and Films, American Institute of Physics, New York, NY, vol. 24, No. 4, Jun. 23, 2006, pp. 1546-1551.

X.J. Yu et al., "Optics of LCoS Projection System Based on Wire-Grid Polarizers", Proceedings of the sixth Chinese Symposium Sep. 12-14, 2003, Piscataway, NJ, IEEE, pp. 189-192.

* cited by examiner

OPTIMALLY CLOCKED TRIM RETARDERS

CROSS-REFERENCE TO RELATED APPLICATIONS

This application claims priority from U.S. Provisional Application Nos. 60/715,829 filed Sep. 9, 2005 and 60/737,113 filed Nov. 16, 2005, both of which are hereby incorporated by reference. This application is related to U.S. patent application Ser. Nos. 11/009,476 filed on Dec. 10, 2004 and 11/419,872 filed May 23, 2006, both of which are hereby incorporated by reference.

MICROFICHE APPENDIX

Not Applicable.

TECHNICAL FIELD

The present application relates generally to polarization compensation for projection displays, and in particular, to optimally clocked trim retarders and LCD-based projection systems including the same.

BACKGROUND OF THE INVENTION

Liquid-crystal displays (LCDs) are widely used in projection displays for large screen televisions and monitors. In these LCD-based projection systems, a high power beam of light is passed through a polarizer before being incident on a LCD panel. The LCD panel controls the polarization of the incident light pixel-by-pixel and redirects it towards the corresponding polarizer/analyzer, which then redirects light having the proper polarization to a projection lens that projects an image onto a screen.

One particularly successful LCD-based projection system is a WGP-based LCoS microdisplay system, which uses both wire grid polarizers (WGPs) and liquid crystal on silicon (LCOS) panels. This microdisplay system, which has been proven to exhibit both high resolution and high image contrast when compared to other microdisplay technologies such as transmissive liquid crystal (xLCD), digital light processor (DLP), and direct-view LCD, typically uses three or more microdisplay panels (e.g., one for each primary color band) to improve on-screen brightness.

Referring to FIG. 1, a conventional 3-panel WGP-based LCoS microdisplay system is shown. The microdisplay system includes a light source 5, which for example is a high-pressure discharge lamp, and a light rod 7. The light rod 7 homogenizes the cone of light produced by the light source 5 to ensure a spatially uniform light distribution. Optionally, the light rod 7 is a polarization conversion light pipe (PCLP) for producing linearly polarized light. A first lens 8a passes the light from the light pipe 7 to a first folding mirror 9, which directs the light to a first dichroic filter 10. The dichroic filter 10 separates out the blue light from the remaining light, and directs the blue light via second 8b and third 8c lenses, and second 17 and third 16 folding mirrors to a first LCoS display panel 20a. The remaining light, which is transmitted through the dichroic filter 10, is directed via fourth and fifth lenses 8d and 8e and a fourth folding mirror 11 to a second dichroic filter 12. The second dichroic filter 12 separates the remaining light into green and red light, the former of which is directed to a second LCoS display panel 20b and the latter of which passes to a third LCoS display panel 20c.

Prior to reaching each LCoS display panel 20a, 20b, and 20c, the incident light first passes through a WGP 15, 14, and 13 and a trim retarder compensator 21a, 21b, and 21c, respectively. Each WGP 15, 14, and 13 is a polarizer/analyser formed from a plurality of parallel micro-wires that transmits light having a polarization orthogonal to the direction of the parallel micro-wires and reflects light having a polarization parallel to the direction of the wires (e.g., if the polarizers are designed to pass horizontal or P—polarized light, as illustrated in FIG. 1, the micro-wires will be perpendicular to the plane of FIG. 1). Each LCoS panel 20a, 20b, and 20c alters the polarization of the linearly polarized incident light pixel-by-pixel and reflects the modulated light back to the corresponding WGP 15, 14, and 13. Since each WGP 15, 14, and 13 is orientated at approximately ±45° with respect to the principal direction of light propagation, in addition to serving as a polarizer/analyzer, each WGP 15, 13 and 14 also serves as a beamsplitter for separating the incoming light from the outgoing light by steering or deflecting the light reflected from the each LCoS panel along an output optical path orthogonal to the incoming optical path. More specifically, each WGP 15, 14, and 13 reflects S-polarized light (e.g., polarized light rotated by 90° by pixels in an ON state) to the X-cube 19. The X-cube 19 aggregates (i.e., converges) the image from each of the three color channels and, via the projection lens 18, projects the final image onto a large screen (not shown). Optionally, each color channel further includes a pre-polarizer (not shown) and/or a clean-up analyzer (not shown), which for example, may include one or more WGPs and/or dichroic sheet polarizers.

The trim retarder compensators 21a, 21b, and 21c (herein simply referred to as trim retarders), are compensating elements used to improve the contrast performance level of the microdisplay system, which is otherwise limited by the residual birefringence of the LCoS panels in the dark (e.g., off) state. In particular, each trim retarder 21a, 21b, and 21c introduces a phase retardance that cancels the retardance resulting from the inherent birefringence of the corresponding LCoS panel. The term 'retardance' or 'retardation', as used herein, refers to linear retardance magnitude as opposed to circular retardance magnitude, unless stated otherwise. Linear retardance is the difference between two orthogonal indices of refraction times the thickness of the optical element. Linear retardance causes a phase difference between two orthogonal linear polarizations, where one polarization is aligned parallel to the extra-ordinary axis of the linear retarder and the other polarization is aligned parallel to the ordinary axis of the linear retarder. In contrast, circular retardance causes a relative phase difference between right- and left-handed circular polarized light.

Linear retardance may be described as either in-plane or out-of-plane retardance. In-plane retardance, expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction (or an average of in-plane indices of refraction), times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-of-plane retardance and in-plane retardance. Notably, in-plane retardance is not observed for the trivial case of 90° ray angle in the birefringent medium.

In the absence of trim retarders 21a-c, the P-polarized polarized light that illuminates each microdisplay panel in the dark (off) state is slightly elliptically polarized upon reflection due to the residual birefringence of the LCoS panels 20a-c. When the elliptically polarized light, which contains both a P- and an S-component, is transmitted to the corresponding WGP 15, 14, 13, the S component is reflected to the X-cube thus allowing dark state light leakage onto the large screen and limiting the contrast of the projection system.

The use of trim retarders 21a-c improves the contrast level by providing in-plane retardance that compensates for the retardance resulting from the residual birefringence in the LCoS panels 20a-c. More specifically, the trim retarders 21a-c are oriented such that their slow axes are configured at orthogonal azimuthal alignment to the slow axes of the LCoS panels 20a-c (termed "crossed axes"), while their fast axes are configured at orthogonal azimuthal alignment to the fast axes of the LCoS panels 20a-c. The terms slow axis (SA) and fast axis (FA), as used herein, refer to the two orthogonal birefringent axes when the linear retardance is measured at normal incidence. Notably, the SA and FA locations change with off-axis illumination as well as reversing the SA/FA roles for a negative out-of-plane retardance component at a large angle of incidence.

Since the slow axes of the trim retarders 21a-c and LCoS panels 20a-c are configured at orthogonal azimuthal orientations, the role of the fast/slow axes switches from the trim retarder 21a-c to the LCoS panel 20a-c for normal incidence light. In other words, light having a specific polarization is alternately delayed more then less, or vice-versa, in the trim retarder 21a-c and the LCoS panel 20a-c, respectively. The net effect is zero relative delay for the incoming polarization, and as a result, an unchanged polarization (i.e., the output light is not elliptically polarized). The corresponding WGP 15, 14, 13 and/or optional clean-up polarizer then rejects the output light so that the dark-state light leakage does not appear on the screen. Since the trim retarders 21a-c do not alter significantly the throughput of the panel on-state, the resulting sequential contrast (full on/full off) is excellent.

In addition to providing in-plane retardance, it is common for trim retarders 21a-c to also provide out-of-plane retardance to increase the field of view. More specifically, it is common for trim retarders to include both an A-plate compensation component for compensating the in-plane retardance and a —C-plate compensation component for compensating for out-of plane retardance. Optionally, trim retarders 21a-c also include an O-plate component. An A-plate is an optical retarder formed from a uniaxially birefringent material having its extraordinary axis oriented parallel to the plane of the plate. A C-plate is an optical retarder formed from a uniaxially birefringent material having its extraordinary axis oriented perpendicular to the plane of the plate (i.e. parallel to the direction of normally incident light). A —C-plate exhibits negative birefringence. An O-plate is an optical retarder formed from a uniaxial birefringent element having its extraordinary axis (i.e., its optic axis or c-axis) oriented at an oblique angle with respect to the plane of the plate.

As discussed above, each trim retarder 21a-c ideally provides an A-plate retardance that matches the in-plane retardance of the corresponding LCoS panel 20a-c in the off-state. In practice, however, the A-plate retardance of both the LCoS panels 20a-c and the trim retarders 21a-c tends to vary within each component due to manufacturing tolerances in device thickness and material birefringence control, as well as operational drifts (temperature, mechanical stress etc). As a result, to ensure adequate compensation it is common to provide a higher A-plate retardance in the trim retarders 21a-c than that exhibited by the LCoS panels 20a-c. For example, a trim retarder with an A-plate retardance of 5 nm (at λ=550 nm) is often provided to compensate for a vertical aligned nematic (VAN) LCoS exhibiting a 2 nm A-plate retardance (at λ=550 nm).

As is known to those of skill in the art, this mismatch in A-plate value requires offsetting of the optic axis of the trim retarder 21a-c, relative to the nominal crossed axes configuration described above. In other words, the trim retarder is 'clocked-in' by rotating its azimuth orientation away from the crossed-axes configuration.

For example, consider a VAN-LCoS, where the slow axis of the panel is typically oriented to be substantially parallel to the bisector of the S- and P-planes (i.e., slow axis at ±45° and ±135°, when P-polarization is parallel to 0°/180° and S-polarization is parallel to ±90°). Notably, orienting the slow axis of the VAN-LCoS at ±45° is important if the VAN-LCoS panel is to be used as an efficient electrically-controlled birefringence (ECB) device, the crossed polarization conversion of which is given by:

$$I_{(output\ crossed\ polarization)} = I_{(input\ linear\ polarization)} \times \left[\sin\left(\frac{2\Delta nd}{\lambda}\pi\right)\sin(2\phi)\right]^2$$

where $\Delta nd$ is the single-pass retardance of the VAN-LCoS panel, $\lambda$ is the illumination wavelength, and $\phi$ is the orientation of the slow-axis relative to the P-polarization. In this configuration, the VAN-LCoS functions approximately as a quarter-waveplate retarder in single pass when the panel is in an on-state.

When the slow and fast axes of the VAN-LCoS panel bisect the S- and P-polarization planes, as discussed above, the over-clocking angle of a higher value trim retarder is calculated from the following equation:

$$\text{Over-clocking azimuthal angle} \approx \frac{\cos^{-1}([\Gamma_a(LC)/\Gamma_a(TR)])}{2}$$

where $\Gamma_a(TR)$ is the trim retarder A-plate retardance and $\Gamma_a(LC)$ is the LCoS A-plate retardance.

Referring to Table 1, the calculated over-clocking angles for trim retarders providing 2 to 10 nm A-plate retardance for compensating an LCoS panel exhibiting 2 nm A-plate retardance are shown. Both positive and negative azimuthal offsets are given. In addition, two more azimuthal locations are found in the opposite quadrant (i.e., the listed over-clocking angles ±180°).

TABLE 1

Approximate over-clocking angles of the trim retarder compensator/VAN-LCoS pair from the nominal crossed-axes configuration.

| $\Gamma_a(TR)$ | Over-clocked angle from nominal crossed axes |
|---|---|
| 2 | 0 |
| 3 | ±24.1 |
| 4 | ±30.0 |
| 5 | ±33.2 |
| 6 | ±35.3 |
| 7 | ±36.7 |
| 8 | ±37.8 |
| 9 | ±38.6 |
| 10 | ±39.2 |

In general, it has been commonly believed by those skilled in the art that all four over-clocking azimuthal angles of a given trim retarder will produce nearly identical overall system contrast performance. With the assumption that each of the four over-clocking azimuthal angles produces a local contrast maximum, which does not vary between over-clocking azimuthal angles, it is possible to rotate arbitrarily the trim retarder/VAN-LCoS pair to any quadrant (i.e., as long as the slow and fast axes of the VAN-LCos still meets the requirement of bisecting the S- and P-polarizations). Accordingly, in practice, it is common to arbitrarily select one of the four over-clocking angles for any given LCoS orientation and/or for any given WGP orientation, which then serves as a starting position for a subsequent experimental fine-tuning.

Recently, it has been predicted that different over-clocking angles produce different system contrast levels for TN-LCoS projection systems using a MacNeille polarization beamsplitter (PBS), including a small difference for TN-LCoS projection systems using a WGP (e.g., see J. Chen, M. G. Robinson and G. D. Sharp, "General Methodology for LCoS Panel Compensation," SID 04, Digest, pp. 990-993, 2004).

More recently, the effect of LCoS orientation on system contrast has been studied for LCoS projection systems using a MacNeille PBS (e.g., see J. Chen, M. G. Robinson, D. A. Coleman, and G. D. Sharp, "Impact of the Orientation of Panel Pretilt Directional and Quarter-wave Plate on LCoS Projection System Contrast," SID 06, Digest, pp. 1606-1609, 2006).

In these studies, however, only two of the four over-clocking angles were examined (i.e., the over-clocking angles with additional rotation ±180° were neglected). Moreover, while the results indicate that the LCoS pretilt direction has a large impact on system contrast (i.e., the system contrast is different for different orientations of the LCoS panel for a given PBS coating surface inclination and/or for different PBS coating surface inclinations for a given LCoS orientation), they do not provide a solution to the contrast inequality. Unfortunately, this means that LCoS engines having different panel orientations and/or different PBS orientations will exhibit different system contrasts. This is a serious concern for manufacturers which require all products to have a same contrast ratio.

SUMMARY OF THE INVENTION

The instant inventors have confirmed, contrary to what is conventionally believed by others skilled in the art, that all four over-clocking azimuthal angles do not produce identical system contrast levels. These varying contrast levels are attributed to a heretofore unrecognized asymmetry in the system, which for example, is evident in the absence of a single axis of symmetry parallel to the normal incidence of the LCoS panel when the net reflected retardance profile of the panel is plotted versus polar and azimuthal viewing angles. Additional asymmetry may be introduced by orienting WGP at ±45° with respect to the z-axis and/or by providing the trim retarder with a tilted component (i.e., as exhibited in the net retardance profile along its slow-axis plane).

The instant invention relates to a method of clocking trim retarders that allows LCoS engines having different panel orientations and/or PBS orientations to exhibit similar system contrasts. More specifically, the instant invention relates to a method of clocking a trim retarder to an azimuthal orientation that is optimal for any one of the four slow-axis quadrant locations of the VAN-LCoS panel and/or for any one of two wiregrid polarizer tilt orientations.

In accordance with one aspect of the instant invention there is provided a liquid crystal display based projection system comprising: a light source; a first polarizer for receiving light from the light source and transmitting a first linearly polarized light having a first linear polarization axis; a liquid crystal display panel for optically modulating the first linearly polarized light, the liquid crystal display panel having a slow-axis and a fast-axis; a second polarizer for receiving the optically modulated light and for transmitting a second linearly polarized light having a second linear polarization axis; a projection lens for projecting the second linearly polarized light onto a screen; and a trim retarder disposed between the liquid crystal display panel and at least one of the first and second polarizers, the trim retarder having an in-plane retardance greater than a residual in-plane retardance of the liquid crystal display panel and having a slow axis, an azimuthal angle of the slow axis selected to be in an azimuthal angle range predetermined to provide a system contrast level that is substantially unaffected by at least one of an orientation of the slow axis of the liquid crystal display panel and orientations of the first and second polarizers.

In accordance with another aspect of the instant invention there is provided a method of clocking a trim retarder comprising: providing a first trim retarder to compensate for residual in-plane retardance of a first liquid crystal display panel in a liquid crystal display based projection system, the liquid crystal display based projection system including: a light source; at least one polarizer for receiving light from the light source, for transmitting a first linearly polarized light having a first linear polarization axis to the first liquid crystal display panel, and for receiving a second linearly polarized light having a second linear polarization axis from the first liquid crystal display panel; and, a projection lens for projecting the second linearly polarized light onto a screen, the first trim retarder having an in-plane retardance greater than a residual in-plane retardance of the first liquid crystal display panel and having a slow axis, determining a first azimuthal angle range for an azimuthal angle of the slow axis of the first trim retarder, the first azimuthal angle range selected to provide a system contrast level that is substantially unaffected by at least one of an orientation of the slow axis of the first liquid crystal display panel and an orientation of the at least one polarizer; and orientating the first trim retarder such that the azimuthal angle of its slow axis is within the first azimuthal angle range.

In accordance with another aspect of the instant invention there is provided a method of clocking trim retarders for use in liquid crystal display based projection systems, the method comprising: providing a trim retarder to compensate for residual in-plane retardance of a liquid crystal display panel, the trim retarder having an in-plane retardance greater than the residual in-plane retardance of the liquid crystal display panel and having a slow axis; determining an optimal azimuthal angle range for an azimuthal angle of the slow axis of the trim retarder, the optimal azimuthal angle range selected to provide a local system contrast maxima that is substantially obtainable for four different slow axis quadrant orientations of the liquid crystal display panel; and orientating the trim retarder such that the azimuthal angle of the slow axis is within the optimal azimuthal angle range.

BRIEF DESCRIPTION OF THE DRAWINGS

Further features and advantages of the present invention will become apparent from the following detailed description, taken in combination with the appended drawings, in which:

FIG. 2b is a plan view of the subsystem illustrated in FIG. 2a;

It will be noted that throughout the appended drawings, like features are identified by like reference numerals.

DETAILED DESCRIPTION OF PREFERRED EMBODIMENTS

Figure 1:
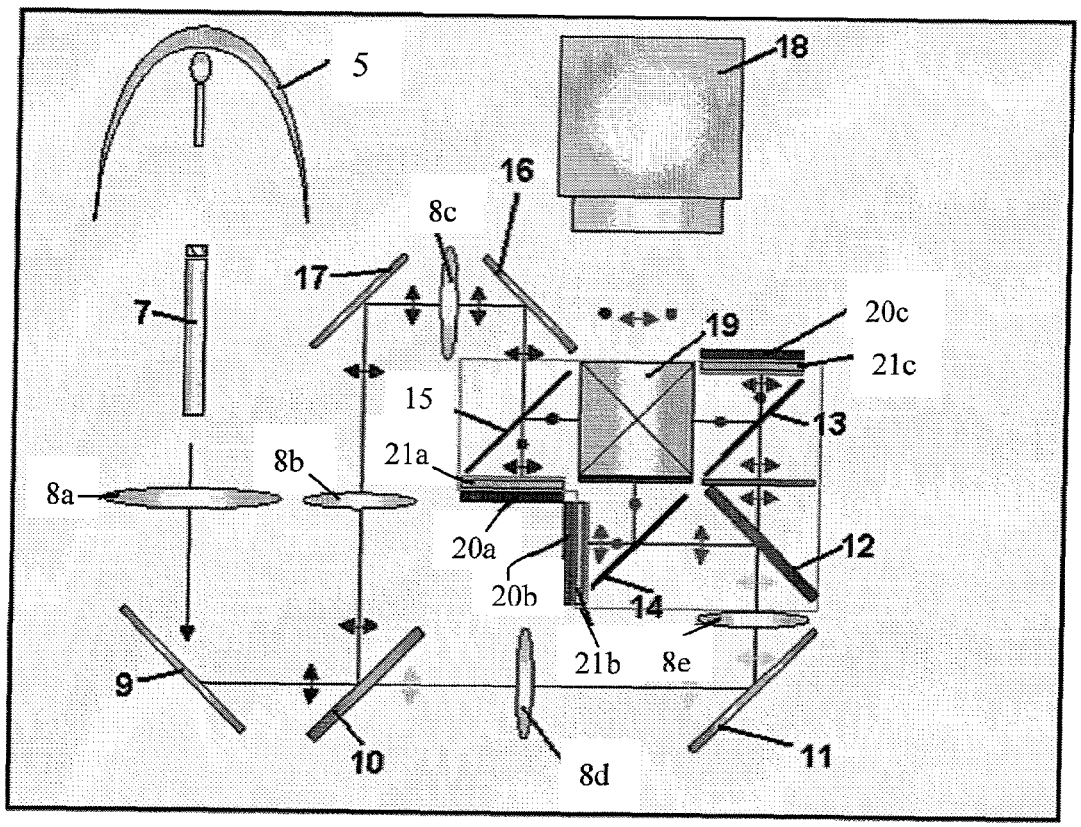
FIG. 1 is a schematic diagram of a prior art 3-panel wire-grid polarizer (WGP) based liquid crystal on silicon (LCOS) projection light engine.

For the purpose of describing the instant invention, selected optics from one color-channel of a WGP-based LCoS microdisplay system, such as the one illustrated in FIG. 1, will be discussed in further detail. Referring to FIGS. 2a and 2b, these optics form a subsystem including a pre-polarizer 200, a WGP 201, a trim retarder 202, a VAN-mode LCoS panel 203, and a clean-up polarizer 204.

The pre-polarizer 200 is a polarizer oriented to transmit P-polarized light (e.g., which is shown as a horizontal double-sided arrow). According to one embodiment, the pre-polarizer includes one or more stages of substantially parallel elements of grid-based (reflective) polarizers (e.g., aluminum wiregrid) or regular dichroic sheet (absorptive) polarizers.

The WGP 201 is a polarizer formed from a plurality of parallel micro-wires disposed on a transparent substrate, as is well known to those skilled in the art. The WGP 201 is oriented such that its transmission axis is substantially parallel to the transmission axis of the pre-polarizer 201 and such that the micro-wires are aligned parallel to the y-axis (i.e., so that it also only transmits P-polarized light). Typically, the wires are located on the rear-side of the WGP substrate (away from the pre-polarizer 201) so that the linear polarized light is less affected by thermal and/or mechanical stress-induced birefringence in the substrate. A second benefit of such a WGP arrangement is to reduce astigmatism and coma aberrations of optical elements in the projection path.

The WGP 201 is not, however, oriented at normal incidence with respect to the central ray of the incident cone bundle. Rather, the WGP 201 is tilted by about 45° degrees with respect to the z-axis. More specifically, the WGP is rotated at +45° about the +y-axis from its initial alignment of being parallel to the XY plane (or simply tilted at +45° w.r.t. z-axis). This adheres to the convention of Euler angle rotation with a right-handed XYZ coordinate system (RH-XYZ). When used in off-normal incidence, as illustrated in FIGS. 2a and 2b, the WGP 201 operates in a high polarization-contrast mode if the transmitted linear polarization (e.g., P-polarization) is contained in the plane of incidence (P-plane). Referring again to FIGS. 2a and 2b, this high contrast configuration requires the micro-wires to be oriented parallel to the S-plane (orthogonal to the plane of incidence with respect to the central ray). Due to the trade-off between brightness and aperture of optical system ("etendue"), the sub-system requires the use of a moderate numerical aperture of each optical element. It is typical to configure the optical elements to function well with f/2.4 system (approximately ±12° in air incidence). The P- and S-plane of polarizations then refer to the linear polarization of the central ray in the cone bundle (hereafter term the principal ray) with respect to each local WGP element.

The trim retarder 202 is a compensating element, which as discussed above, is used to improve the contrast performance level of the microdisplay system. The trim retarder 202 includes an A-plate component and, optionally, a C-plate and/or O-plate component. More specifically, the trim retarder 202 provides a higher A-plate retardance than the in-plane retardance of LCoS 204. As a result, the trim retarder 202 is over-clocked such that its SA 230 is oriented in the neighboring quadrant (i.e., quadrant 3 with respect to RH-XYZ coordinate system) in a non-crossed manner. According to Table 1, for a moderately higher trim retarder retardance and a rather low VAN-LCoS panel retardance, the location of the SA 230 is typically less than 30°, and still more preferably less than 15° from the closest 'S' or 'P' axis.

Trim retarders are well known in the art. Some examples of materials used to form trim retarders include isotropic polymer that has been stretched either in one or two axes to form a biaxial or uniaxial negative birefringent layer, biaxial organic foil such as cellulose acetate, discotic film, birefringent crystal, inorganic thin film, distorted helix ferroelectric liquid crystal polymer, and/or a liquid crystal mixture crossed linked into a polymer host (LCP). The latter has been proven to be very versatile in terms of reliability, uniformity and ease of retardance targeting, and furthermore, to be integrated with inorganic thin-films to provide —C-plate functionality. The resulting full function trim retarder has been further proven to provide excellent contrast compensation as well as be environmentally stable.

The VAN-LCoS panel 203 is a vertically aligned nematic mode liquid crystal on silicon panel, as is well known in the art. The panel 203 is shown to include an opaque substrate 203a and a switchable liquid crystal layer 203b. The cover glass and metal reflectors are not shown. The LCoS panel 203 is oriented with its slow-axis (SA) 220 located in the fourth quadrant of a RH-XYZ coordinate system, while looking at the beam coming to the observer in the first pass (RH-XYZ). In describing the SA 220 of a VAN-LCoS panel, reference is made to the azimuthal orientation of the SA 220 with a polar angle tilt towards +z axis (positive tilt). The fast-axis (FA) 221 of the VAN-LCoS panel is orthogonal to the SA orientation (i.e., ±90° azimuthal offset to SA). The FA 221 is located in quadrant 1, at 45° azimuthal angle from the x-axis.

The VAN-LCoS 203 is shown being aligned in portrait mode. More specifically, the rectangularly shaped (e.g., 4:3 or 16:9 aspect ratio) display unit is oriented such that the longest dimension is aligned parallel to the WGP wires. An advantage of using portrait mode is that the dimension of tilted WGP has to be increased by a factor of ~1.41 (i.e., 1/cos(45°)) vs. a non-tilted WGP. Therefore the 16/9 aspect ratio of the WGP at normal incidence becomes ~1.26, rather than ~2.51 if a landscape mode for VAN-LCoS is chosen. A near unity aspect ratio ensures that WGP flexing at high heat and high flux conditions is minimized. Of course, a VAN-LCoS 203 aligned in landscape mode is also possible.

The clean-up polarizer 204 is a polarizer oriented to transmit S-polarized light (e.g., which is represented with a vertical double-sided arrow in FIG. 2a and a dot in FIG. 2b). Both the pre-polarizer 200 and the clean-up polarizer 204 are similarly located and non-tilted with respect to the principal ray propagation direction. According to one embodiment, the clean-up polarizer 204 includes one or more stages of substantially parallel absorptive polarizer elements.

In operation, unpolarized or partial polarized light 240 output from a prior stage illumination (not shown) is passed through the pre-polarizer 200 to obtain P-polarized light 241. The light is transmitted through the WGP 201 and its polarization extinction ratio enhanced. The trim retarder 202 pre-conditions the incoming P-polarization beam 242 and creates an elliptical output. Ideally, the ellipticity in the polarized light incident onto the LCoS panel 204, which is in a dark (off) state, is undone by the residual panel retardance. The reflected light, after completing a double pass through the VAN-LCoS panel 203 and the trim retarder 202, thus remains P-polarized. However, for a given cone bundle and some spatial variation of both the trim retarder and the VAN-LCoS panel retardance and axis orientations, the exiting light will have accumulated some ellipticity 243. The slightly elliptically polarized light 243 is analyzed by the WGP 201. More specifically, the S-polarized component 244 of the elliptically polarized light is deflected by the wire side of the WGP 201 to an orthogonal path 212. This component is termed 'S-leakage' and passes through the clean-up polarizer 204. The leakage is relayed to the screen (not shown) by a projection lens (not shown), and contributes to the degradation of sequential contrast. The remaining P-polarization component 245 transmitted by the WGP 201 is injected back into the illumination system via optical path 213 and is eventually lost.

Figure 2A:
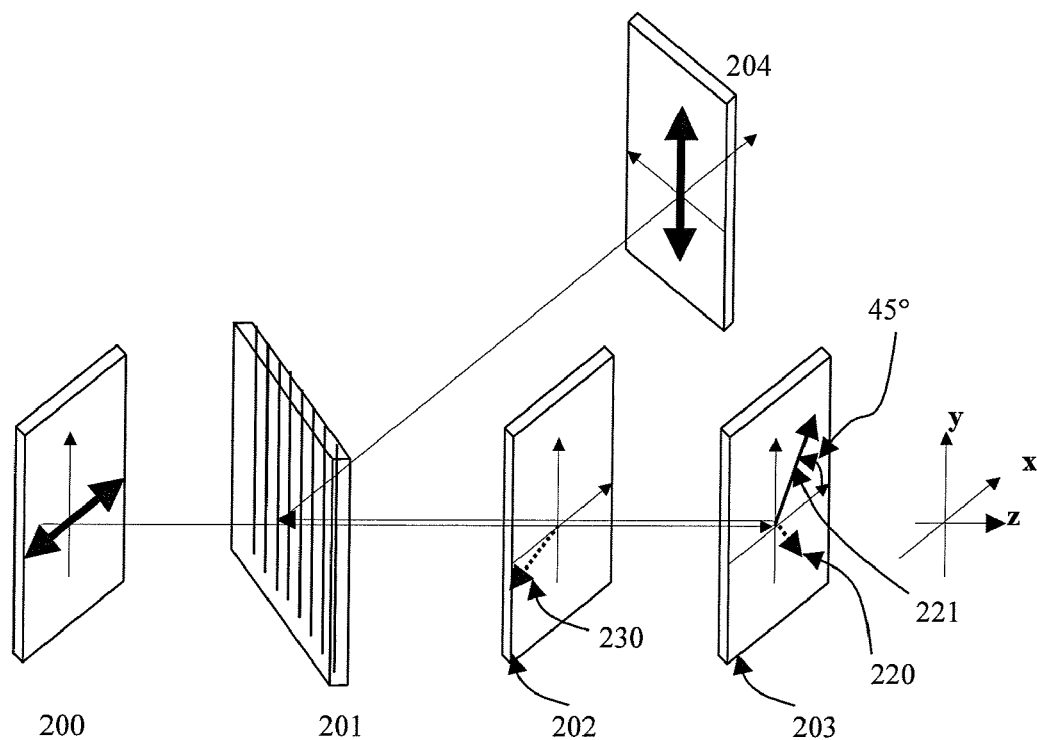
FIG. 2a is a schematic diagram of a subsystem of a multi-panel WGP-based LCoS projection light engine wherein the WGP is oriented at +45° to the z-axis.
Figure 2B:
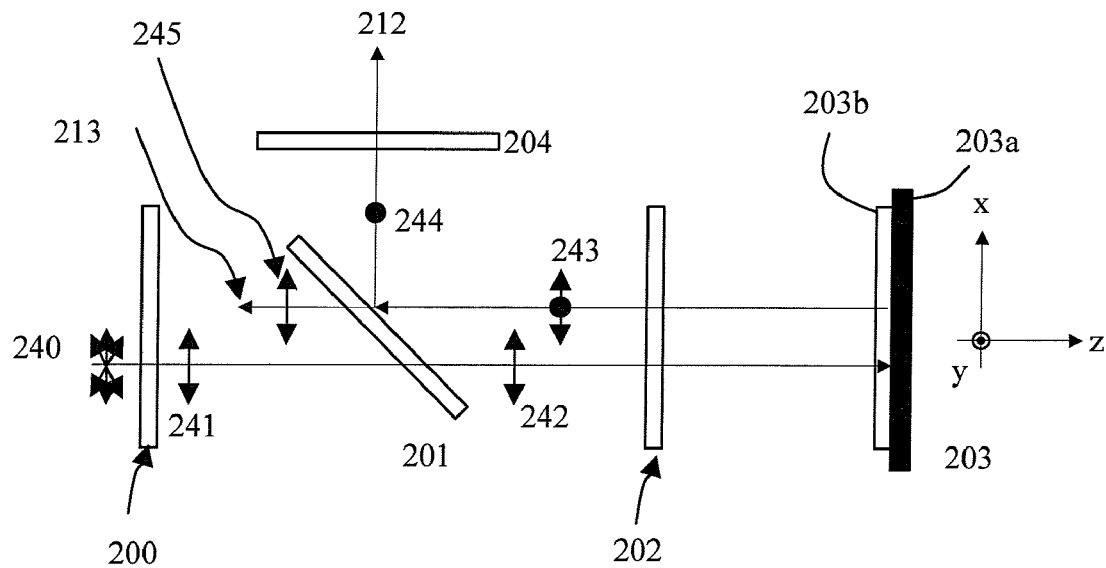
Figure 2C:
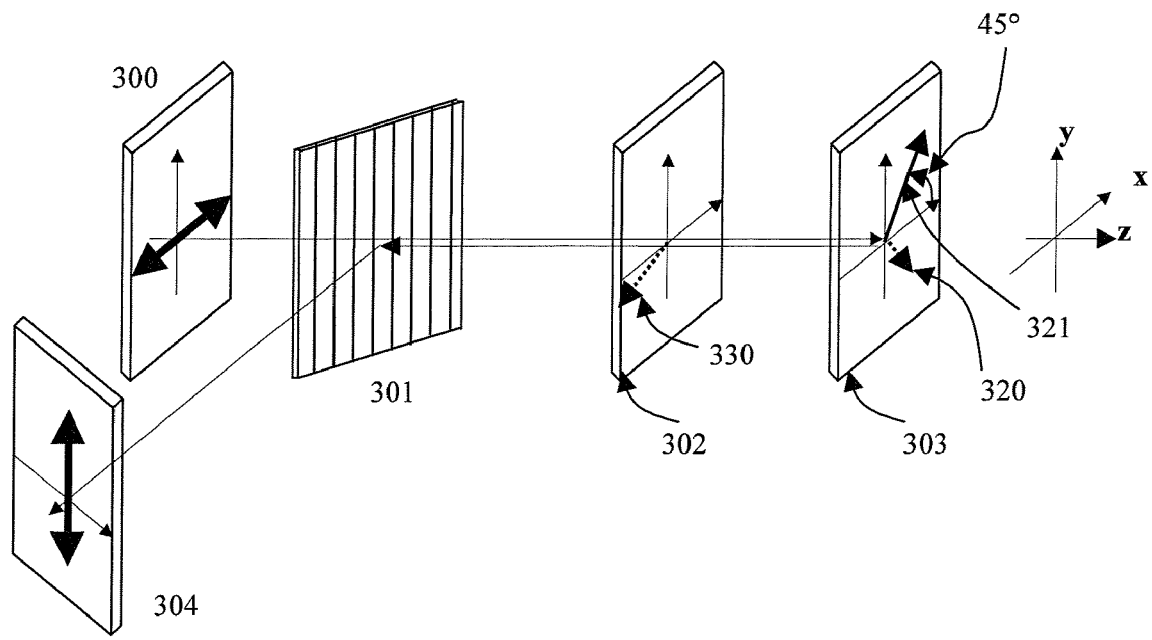
FIG. 2c is a schematic diagram of a subsystem of a multi-panel WGP-based LCoS projection light engine wherein the WGP is oriented at −45° to the z-axis.
Figure 2D:
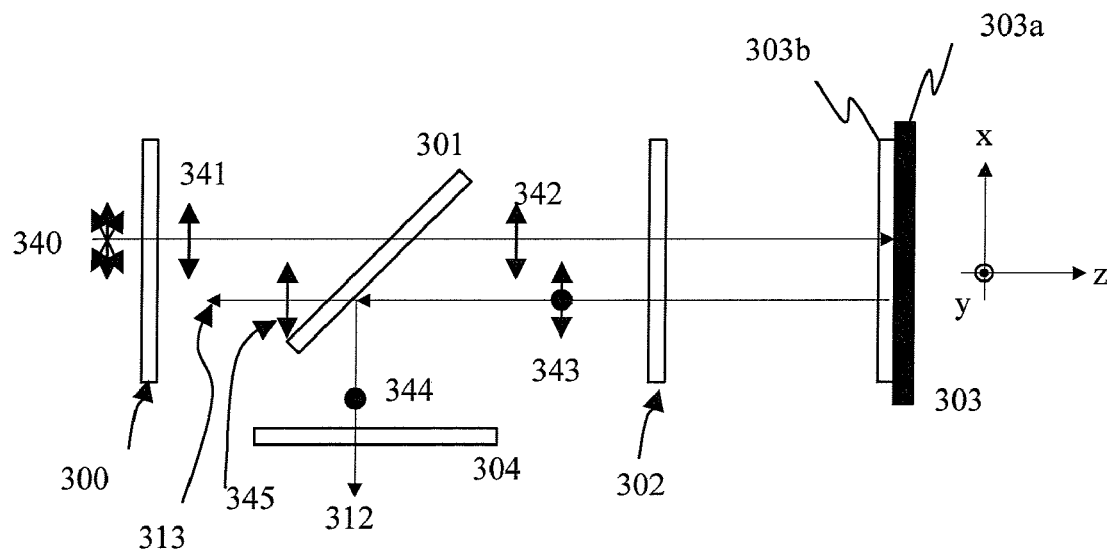
FIG. 2d is a plan view of the subsystem illustrated in FIG. 2c.

Referring to FIGS. 2c and 2d, selected optics from another color-channel of the WGP-based LCoS microdisplay system is shown. These optics form a subsystem including a pre-polarizer 300, a WGP 301, a trim retarder 302, a VAN-mode LCoS panel 303, and a clean-up polarizer 304.

The pre-polarizer 300 is a polarizer oriented to transmit P-polarized light (e.g., which is shown as a horizontal double-sided arrow). According to one embodiment, the pre-polarizer includes one or more stages of substantially parallel elements of grid-based (reflective) polarizers (e.g., aluminum wiregrid) or regular dichroic sheet (absorptive) polarizers.

The WGP 301 is a polarizer formed from a plurality of parallel micro-wires disposed on a transparent substrate, as is well known to those skilled in the art. The WGP 301 is oriented such that its transmission axis is substantially parallel to the transmission axis of the pre-polarizer 301 and such that the micro-wires are aligned parallel to the y-axis (i.e., so that it also only transmits P-polarized light). Typically, the wires are located on the rear-side of the WGP substrate (away from the pre-polarizer 301) so that the linear polarized light is less affected by thermal and/or mechanical stress-induced birefringence in the substrate. A second benefit of such a WGP arrangement is to reduce astigmatism and coma aberrations of optical elements in the projection path.

The WGP 301 is not, however, oriented at normal incidence with respect to the central ray of the incident cone bundle. Rather, the WGP 301 is tilted by about 45° degrees with respect to the z-axis. More specifically, the WGP is rotated at −45° about the +y-axis from its initial alignment of being parallel to the XY plane (or simply tilted at −45° w.r.t. z-axis). This adheres to the convention of Euler angle rotation with a right-handed XYZ coordinate system (RH-XYZ). When used in off-normal incidence, as illustrated in FIGS. 2c and 2d, the WGP 301 operates in a high polarization-contrast mode if the transmitted linear polarization (e.g., P-polarization) is contained in the plane of incidence (P-plane). Referring again to FIGS. 2c and 2d, this high contrast configuration requires the micro-wires to be oriented parallel to the S-plane (orthogonal to the plane of incidence with respect to the central ray). Due to the trade-off between brightness and aperture of optical system ("etendue"), the sub-system requires the use of a moderate numerical aperture of each optical element. It is typical to configure the optical elements to function well with f/2.4 system (approximately ±12° in air incidence). The P- and S-plane of polarizations then refer to the linear polarization of the central ray in the cone bundle (hereafter term the principal ray) with respect to each local WGP element.

The trim retarder 302 is a compensating element, which as discussed above, is used to improve the contrast performance level of the microdisplay system. The trim retarder 302 includes an A-plate component and, optionally, a C-plate and/or O-plate component. More specifically, the trim retarder 302 provides a higher A-plate retardance than the in-plane retardance of LCoS 303. As a result, the trim retarder 302 is over-clocked such that its SA 330 is oriented in the neighboring quadrant (i.e., quadrant 3 with respect to RH-XYZ coordinate system) in a non-crossed manner. According to Table 1, for a moderately higher trim retarder retardance and a rather low VAN-LCoS panel retardance, the location of the SA 330 is typically less than 30°, and still more preferably less than 15° from the closest 'S' or 'P' axis.

Trim retarders are well known in the art. Some examples of materials used to form trim retarders include isotropic polymer that has been stretched either in one or two axes to form a biaxial or uniaxial negative birefringent layer, biaxial organic foil such as cellulose acetate, discotic film, birefringent crystal, inorganic thin film, distorted helix ferroelectric liquid crystal polymer, and/or a liquid crystal mixture crossed linked into a polymer host (LCP). The latter has been proven to be very versatile in terms of reliability, uniformity and ease of retardance targeting, and furthermore, to be integrated with inorganic thin-films to provide—C-plate functionality. The resulting full function trim retarder has been further proven to provide excellent contrast compensation as well as be environmentally stable.

The VAN-LCoS panel 303 is a vertically aligned nematic mode liquid crystal on silicon panel, as is well known in the art. The panel 303 is shown to include an opaque substrate 303a and a switchable liquid crystal layer 303b. The cover glass and metal reflectors are not shown. The LCoS panel 303 is oriented with its slow-axis (SA) 320 located in the fourth quadrant of a RH-XYZ coordinate system, while looking at the beam coming to the observer in the first pass (RH-XYZ). In describing the SA 320 of a VAN-LCoS panel, reference is made to the azimuthal orientation of the SA 320 with a polar angle tilt towards +z axis (positive tilt). The fast-axis (FA) 321 of the VAN-LCoS panel is orthogonal to the SA orientation (i.e., ±90° azimuthal offset to SA). The FA 321 is located in quadrant 1, at 45° azimuthal angle from the x-axis.

The VAN-LCoS 303 is shown being aligned in portrait mode. More specifically, the rectangularly shaped (e.g., 4:3 or 16:9 aspect ratio) display unit is oriented such that the longest dimension is aligned parallel to the WGP wires. An advantage of using portrait mode is that the dimension of tilted WGP has to be increased by a factor of ~1.41 (i.e., 1/cos(45°)) vs. a non-tilted WGP. Therefore the 16/9 aspect ratio of the WGP at normal incidence becomes ~1.26, rather than ~2.51 if a landscape mode for VAN-LCoS is chosen. A near unity aspect ratio ensures that WGP flexing at high heat and high flux conditions is minimized. Of course, a VAN-LCoS 303 aligned in landscape mode is also possible.

The clean-up polarizer 304 is a polarizer oriented to transmit S-polarized light (e.g., which is represented with a vertical double-sided arrow in FIG. 2c and a dot in FIG. 2d). Both the pre-polarizer 300 and the clean-up polarizer 304 are similarly located and non-tilted with respect to the principal ray propagation direction. According to one embodiment, the clean-up polarizer 304 includes one or more stages of substantially parallel absorptive polarizer elements.

In operation, unpolarized or partial polarized light 340 output from a prior stage illumination (not shown) is passed through the pre-polarizer 300 to obtain P-polarized light 341. The light is transmitted through the WGP 301 and its polarization extinction ratio enhanced. The trim retarder 302 preconditions the incoming P-polarization beam 343 and creates an elliptical output. Ideally, the ellipticity in the polarized light incident onto the LCoS panel 303, which is in a dark (off) state, is undone by the residual panel retardance. The reflected light, after completing a double pass through the VAN-LCoS panel 303 and the trim retarder 302, thus remains P-polarized. However, for a given cone bundle and some spatial variation of both the trim retarder and the VAN-LCoS panel retardance and axis orientations, the exiting light will have accumulated some ellipticity 343. The slightly elliptically polarized light 343 is analyzed by the WGP 301. More specifically, the S-polarized component 344 of the elliptically polarized light is deflected by the wire side of the WGP 301 to an orthogonal path 312. This component is termed 'S-leakage' and passes through the clean-up polarizer 304. The leakage is relayed to the screen (not shown) by a projection lens (not shown), and contributes to the degradation of sequential contrast. The remaining P-polarization component 345 transmitted by the WGP 301 is injected back into the illumination system via optical path 313 and is eventually lost.

Notably, the WGP 201 illustrated in FIGS. 2a and 2b is tilted at +45° w.r.t. the z-axis, which is the same orientation used in the red and blue color channels of the LCoS projection system illustrated in FIG. 1 (i.e., analogous to 13, 15), whereas the WGP 301 illustrated in FIGS. 2c and 2d is tilted at −45° w.r.t. the z-axis, which is the same orientation used in the green color channel (i.e., analogous to 14). More specifically, the first WGP 201 is the mirror image of the second WGP 301. When the subsystems illustrated in FIGS. 2a and 2c are used in the same LCoS projection system, as for example illustrated in FIG. 1, the trim retarders 202 and 302 will or will not be identically oriented. Ideally, the same trim retarder is usable for a given LCoS panel for two different orientations of the WGP with indistinguishable overall contrast performance.

TABLE 2

Device parameters, assumptions and performance parameters of a simulation of two-stage trim retarder compensator and VAN-LCoS panel birefringence compensation.

| Parameter | Trim Retarder | VAN-LCoS |
|---|---|---|
| A-plate Retardance (nm) | 7 | 2 |
| C-plate Retardance (nm) | −220 | 250 |
| LC pretilt (deg) | — | 4.5 |
| LC director azimuth (deg) with reference to LH-XYZ coordinate system | −98.1 | −45 |
| Overall system Contrast Ratio (×1000) | | 6.7 |
| Double-pass forward Contrast Ratio (×1000) | | 22.7 |
| TR reflection Contrast Ratio (×1000) | | 180 |
| System Baseline Contrast Ratio (×1000) | | 10 |
| Pre-polarizer + WGP Transmission Contrast Ratio at normal incidence (×1000) | | 450 |
| Clean-up polarizer + WGP Reflection Contrast Ratio at normal incidence (×1000) | | 30 |
| Ordinary index of LCoS at λ = 550 nm | | 1.50 |
| Extraordinary index of LCoS at λ = 550 nm | | 1.65 |
| Ordinary index of TR −C-plate at λ = 550 nm | | 1.65 |
| Extraordinary index of TR −C-plate at λ = 550 nm | | 1.50 |

Table 2: Device parameters, assumptions and performance parameters of a simulation of two-stage trim retarder compensator and VAN-LCoS panel birefringence compensation.

Figure 3:
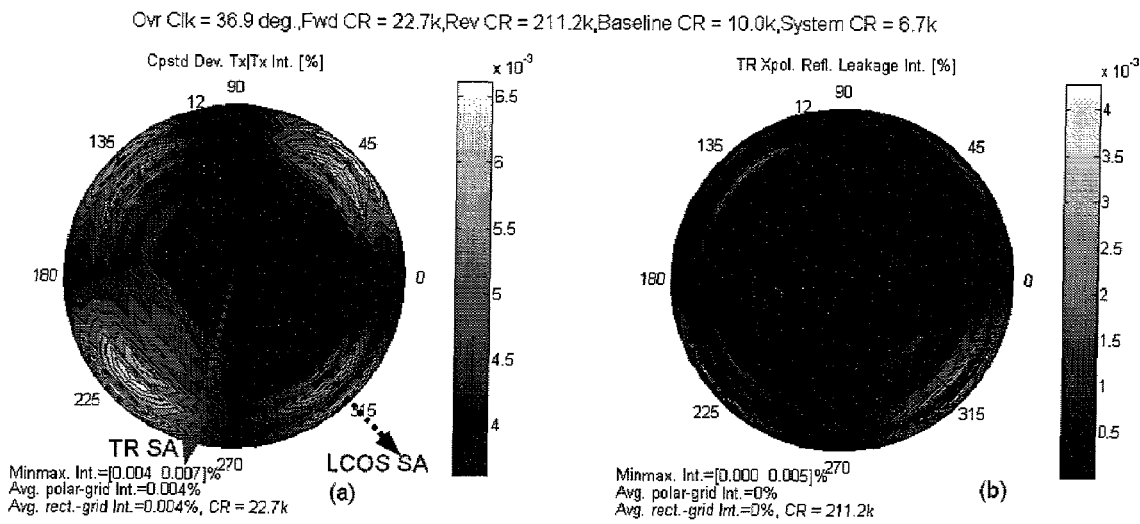
FIG. 3 shows the simulated double-pass contrast of cascading a full-function trim retarder to a 2 nm/250 nm A/C-plate VAN-LCoS panel.

With a system baseline contrast of 10,000:1, the incoherent sum of double-pass TR/LCoS and TR reflection orthogonal polarization leakage light (S-leakage) is modeled at 6,700:1 at λ=550 nm. Referring to FIG. 3, viewing map (a) shows the simulated double-pass TR/LCoS S-leakage transmission of LCoS light-off state, whereas viewing map (b) shows the reflection S-leakage of the trim retarder compensator alone. LH-XYZ coordinate system is employed. Clearly, the panel is well compensated with uniform and low level of leakage light intensity for every ray angle in the cone bundle.

The system baseline contrast is the cone-weighted photopic contrast ratio of the optical system when the panel is replaced by a high quality mirror and the TR is removed from its typical location. This baseline quantity measures the off-axis leakage light of the crossed polarizers, including WGP. The polarization contrast of the pre-polarizers, WGP and clean-up polarizers is obtained from published data. Assuming that the WGP is only used as a beam-splitting device and both the pre- and clean-up polarizers are made of dichroic sheets, the polarization contrast of the light that is incident on the TR is approximately given by the product of WGP transmitted polarization contrast and dichroic transmitted polarization contrast: 450×1000. In the return pass, the WGP reflection is significantly poorer in polarization contrast, giving a 30×1000 polarization contrast for the crossed analyzer. These two polarization extinction ratios (inverse of polarization contrast) are utilized as Jones vectors for the input polarizer and output analyzer in the model. Thus, the off-axis effects of the crossed polarizers are taken into account by the system baseline contrast.

In this simulated model, the overall system contrast is not dependent on the orientation of the slow-axis of the TR. In fact, numerical results indicate contrast ratio variations of <<1% for different TR orientations. In the numerical model the LCoS panel has its SA oriented at −45° LH-XYZ system, whereas the nominal SA of the TR is oriented at −98.1° LH-XYZ system. The over-clocking angle obtained from the approximate analytic expression is ±36.7° azimuthal offset from the crossed axes configuration or a further 180° offset of these two locations. None of the four TR orientations in the numerical model produces appreciable difference from the nominal contrast ratio of 6,700:1, assuming a 10,001:1 system baseline contrast.

Experimental measurements of system contrast, however, have been found to provide differential contrast ratios as large as 30% in some color bands, for the same VAN-LCoS panel SA-orientation as modeled. The experimental contrast ratios are tabulated in Table 3 for red, green and blue color channels.

TABLE 3

Experimental measurements of system contrast of a single-channel light engine in the blue, green and red bands. Configuration 540

| TR SA | Blue band (420 nm-490 nm) Contrast ratio (asymmetric TR) | Green band (500 nm-590 nm) Contrast ratio (asymmetric TR) | Red band (590 nm-700 nm) Contrast ratio (asymmetric TR) |
|---|---|---|---|
| 546 | 3300 | 4900 | 6800 |
| 547 | 4500 | 5900 | 7900 |
| 548 | 3500 | 5100 | 6800 |
| 549 | 3400 | 4900 | 6800 |
| Baseline CR | 6000 | 10000 | 12000 |
| Gain | 1.36× | 1.20× | 1.16× |

The WGP configuration in the experimental set-up was similar to that shown in FIG. 2c, with the WGP tilted at −45° w.r.t. the z-axis. More specifically, the WGP was tilted at −45° w.r.t. the z-axis and the SA of the panel was oriented at −45° with reference to LH-XYZ coordinate system (i.e., in the fourth quadrant). This configuration, which is labelled 540, is clearly illustrated in FIG. 5c. The four possible TR SA orientations, which are labelled 546, 547, 548, and 549, were found using the ±over-clocking angles and their ±180° variants. SA orientations 548 and 549 are located in quadrant 1, whereas SA orientations 546 and 547 are located in quadrant 3. The actual azimuthal over-clocked angle is dependent on the exact A-plate retardance of the TR and the VAN-LCoS panel, in each color band.

The experimental contrast ratios were obtained by ratioing the photopically weighted on-stage intensity and off-state intensity values. The wavelength range for each color band is given in Table 3. The measured system baseline values were 12,000:1, 10,000:1 and 6,000:1, in the red, green and blue wavelength bands, respectively, for a convergent f/2.4 cone of light. Referring again to Table 3, it is evident that the optimal system contrast ratios are approximately 4,500, 5,900 and 7,900 to 1 in the blue, green and red wavelength bands, respectively. This optimal orientation, which corresponds to the TR SA 547 located in quadrant 3, is located between 180° and 225° azimuth angle w.r.t. LH-XYZ coordinate system. The gain from comparing the worst TR SA orientation and the optimal TR SA orientation is approximately 35%, 20% and 15%, in the blue, green and red wavelength bands, respectively.

The azimuthal angles used here (experimental and numerical model) are referenced to the RH-XYZ coordinate system. When a device model is specified, the RH-XYZ coordinate system is referenced to the incidence; when viewing the transmitted field, RH-XYZ coordinate system is referenced to the transmitted beam; when viewing the reflected or double-pass transmission field, the RH-XYZ coordinate system is referenced to the returned beam. As a consequence of this convention, the coordinate sets in the transmitted and incident sides are consistent to each other but the coordinate set in the reflected side has a left-right mirror property versus the incident coordinate set. In the description of elliptical polarizer and retarder, the sign of elliptical eigenpolarization is used consistently in the incident, transmitted and reflected sides.

Figures 4A, 4B:
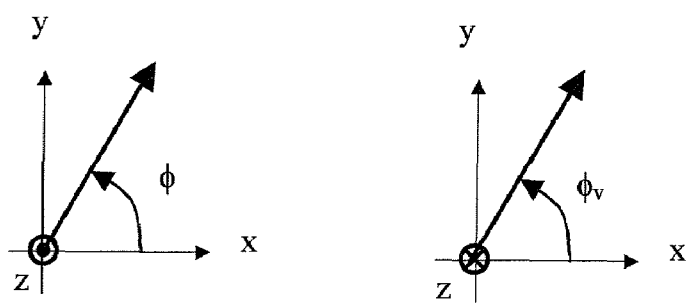
FIG. 4a illustrates the right-handed XYZ coordinate system, when viewing the beam coming to the observer, along with counter-clockwise (CCW) convention for positive azimuthal angles.
FIG. 4b illustrates the left-handed XYZ coordinate system, when viewing the beam away from the observer, along with CCW convention for positive azimuthal angles.

The RH-XYZ coordinate system is shown in FIG. 4a. The coordinate axes represent the RH-XYZ when specifying the Euler angles (two angles for uniaxial medium and three angles for biaxial medium) w.r.t. viewing the incident beam head-on. Polar and azimuthal angles of each uniaxial layer are represented by ($\theta_c$, $\phi_c$). When a reflective (or double-pass transmission) device is viewed from the input side, the RH-XYZ system is maintained by reversing the direction of the X-axis. The RH-XYZ coordinate set for reflection viewing is equivalent to a LH-XYZ coordinate set as referenced to the incident beam (i.e., viewing the back of the incidence). This is shown in FIG. 4b. In both RH-XYZ and LH-XYZ coordinate systems (global definition, as they are both referenced to the incidence), the azimuthal angle is defined positive for counter clockwise (CCW) rotation from the positive x-axis. This axis orientation is used for example to describe the fast/slow axes of a retarder. For specifying the viewing plane in a cone of light, the transmitted viewing plane is aligned to the plane of incidence. However, for a reflective (or double-pass transmission) system, the viewing plane has a 180° offset from the plane of incidence (for a 360° azimuthal plane range and a 0 to 90° polar angle range).

Figure 5A:
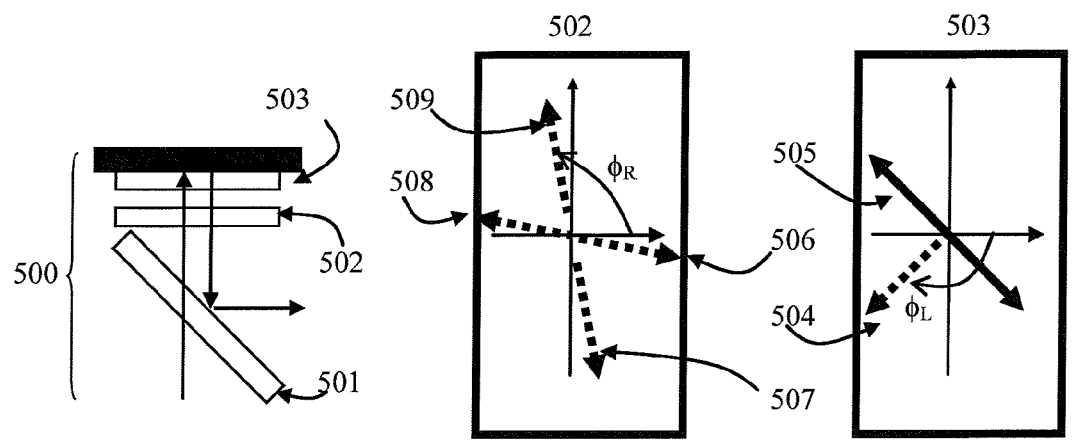
FIG. 5a shows the possible SA orientations of the TR when the WGP is oriented at −45° w.r.t. z-axis and the SA of the LCoS is located in the third quadrant (i.e., panel orientation #1)
Figure 5B:
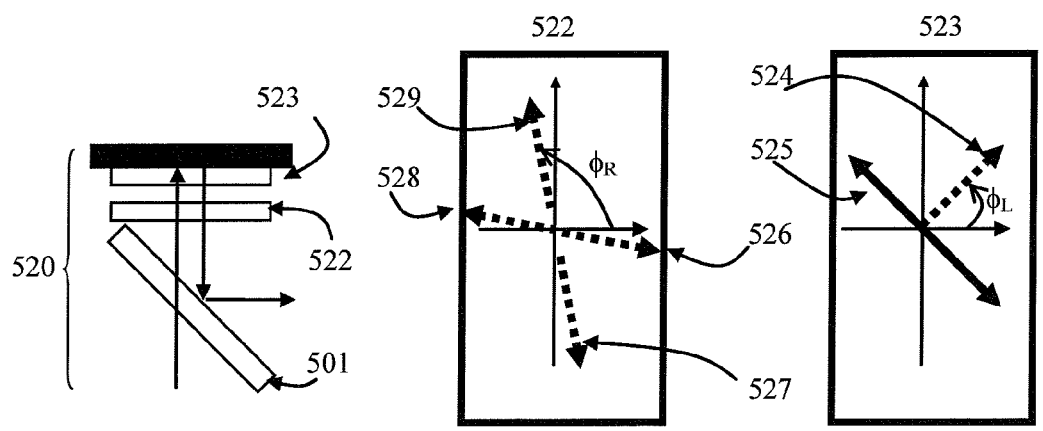
FIG. 5b shows the possible SA orientations of the TR when the WGP is oriented at −45° w.r.t. z-axis and the SA of the LCoS is located in the first quadrant (i.e., panel orientation #2)
Figure 5C:
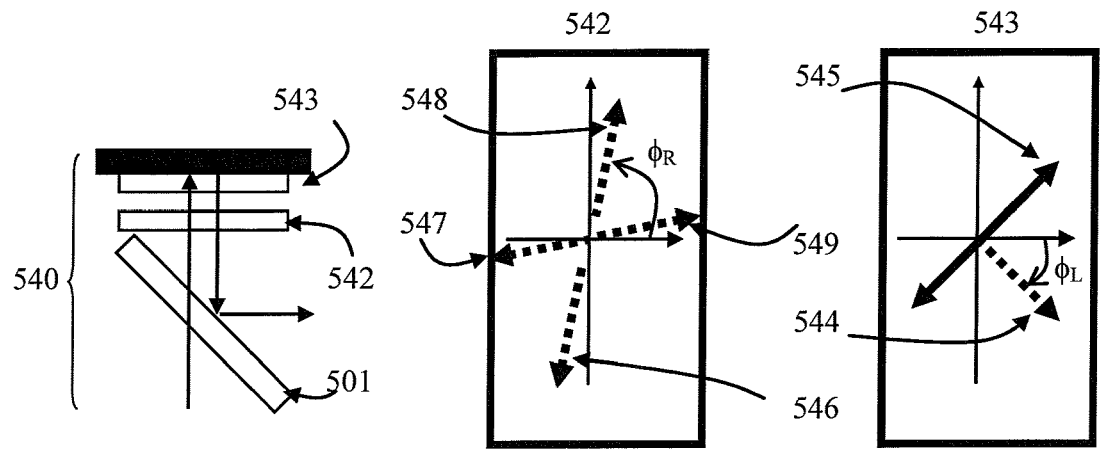
FIG. 5c shows the possible SA orientations of the TR when the WGP is oriented at −45° w.r.t. z-axis and the SA of the LCoS is located in the fourth quadrant (i.e., panel orientation #3)
Figure 5D:
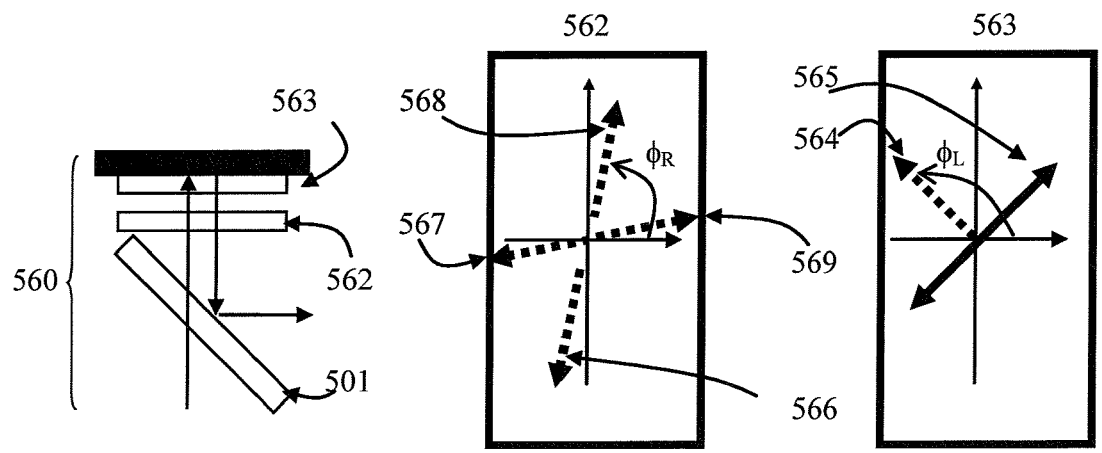
FIG. 5d shows the possible SA orientations of the TR when the WGP is oriented at −45° w.r.t. z-axis and the SA of the LCoS is located in the second quadrant (i.e., panel orientation #4)

With the conventions for XYZ coordinate system established, all possible configurations of the TR and LCoS in the subsystems illustrated in FIGS. 2a-d are further analysed. Referring to FIGS. 5a-d, the possible configurations of the TR and LCoS orientations when the WGP 501 is oriented at −45° w.r.t. z-axis are shown. More specifically, FIG. 5a shows a first configuration 500 including four possible SA orientations (506, 507, 508, and 509) of the TR 502 for a first LCoS panel 503 orientation wherein the LCoS SA 504 is located in quadrant 3 substantially orthogonal to the fast axis 505. FIG. 5b shows a second configuration 520 including four possible SA orientations (526, 527, 528, and 529) of the TR 522 for a second LCoS panel 523 orientation wherein the LCoS SA 524 is located in quadrant 1 substantially orthogonal to the fast axis 525. FIG. 5c shows a third configuration 540 including four possible SA orientations (546, 547, 548, and 549) of the TR 542 for a third LCoS panel 543 orientation wherein the LCoS SA 544 is located in quadrant 4 substantially orthogonal to the fast axis 545. FIG. 5d shows a fourth configuration 560 including four possible SA orientations (566, 567, 568, and 569) of the TR 562 for a fourth LCoS panel 563 orientation wherein the LCoS SA 564 is located in quadrant 2 substantially orthogonal to the fast axis 565. These configurations 500, 520, 540 and 560 are referenced to LH-XYZ coordinate system. The SA 504, 524, 544, and 564 of the panels are assumed to substantially bisect the system S- and P-polarization directions (for example within ±10° of bisector).

Figure 6A:
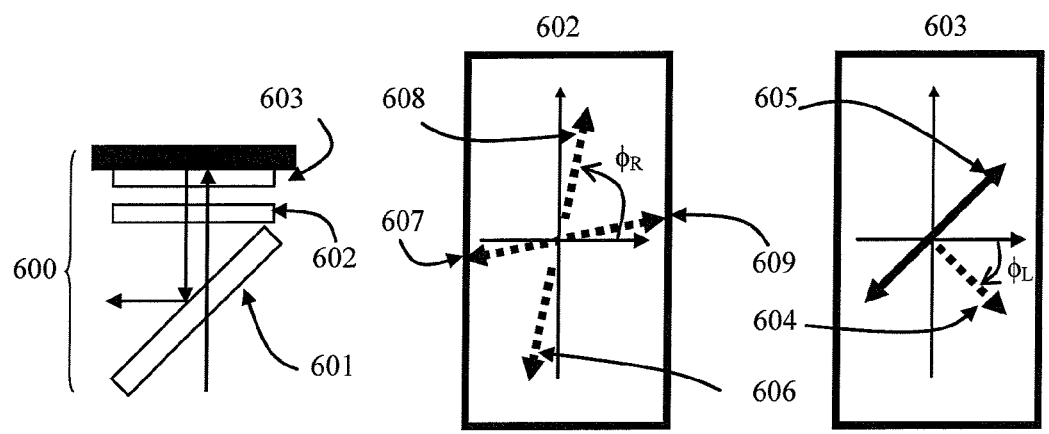
FIG. 6a shows the possible SA orientations of the TR when the WGP is oriented at +45° w.r.t. z-axis and the SA of the LCoS is located in the fourth quadrant (i.e., panel orientation #3)
Figure 6B:
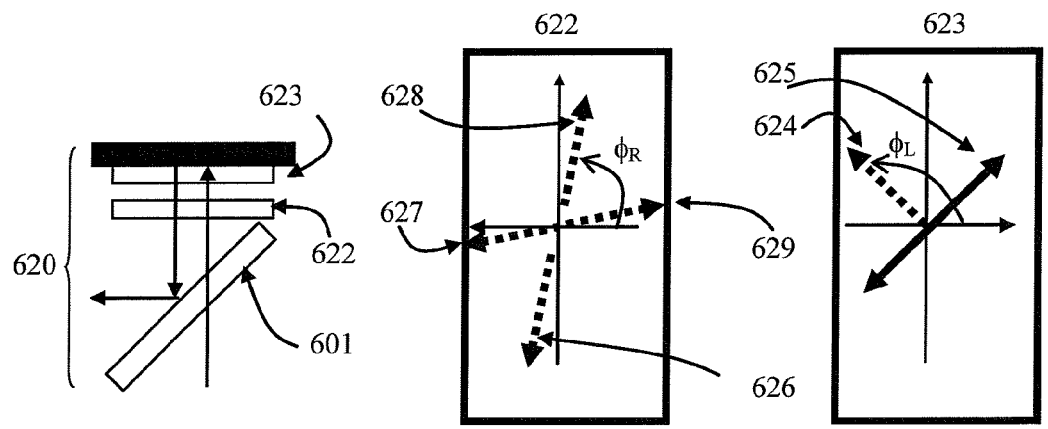
FIG. 6b shows the possible SA orientations of the TR when the WGP is oriented at +45° w.r.t. z-axis and the SA of the LCoS is located in the second quadrant (i.e., panel orientation #4)
Figure 6C:
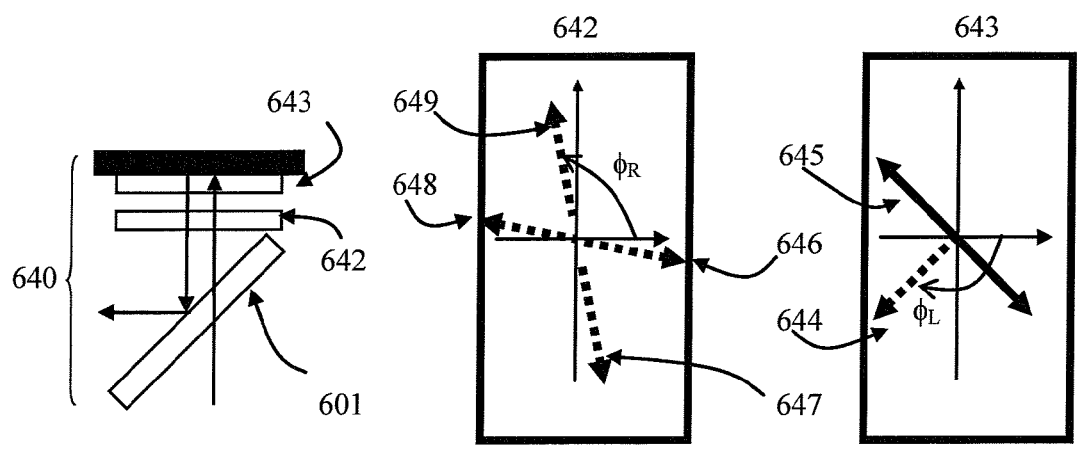
FIG. 6c shows the possible SA orientations of the TR when the WGP is oriented at +45° w.r.t. z-axis and the SA of the LCoS is located in the third quadrant (i.e., panel orientation #1)
Figure 6D:
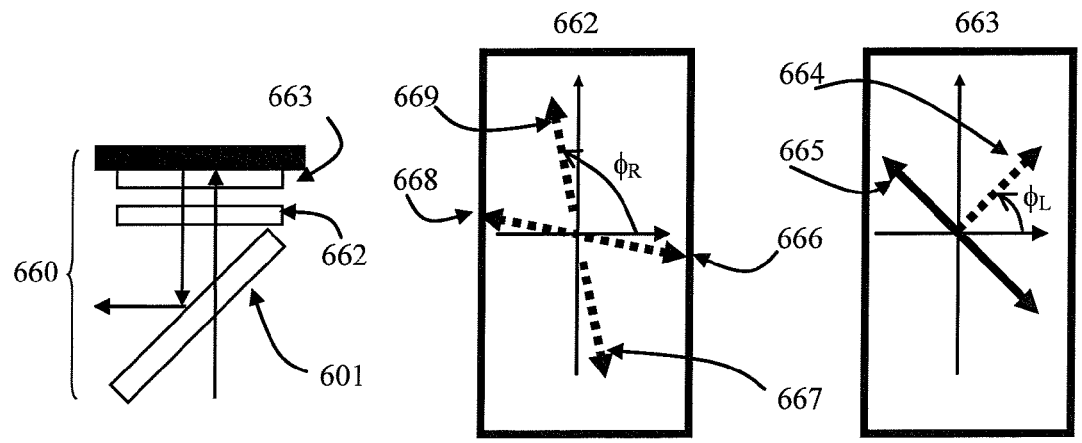
FIG. 6d shows the possible SA orientations of the TR when the WGP is oriented at +45° w.r.t. z-axis and the SA of the LCoS is located in the first quadrant (i.e., panel orientation #2)

Referring to FIGS. 6a-d, the four possible LCoS panel SA orientations, and sixteen possible TR SA orientations, when the WGP 601 is oriented at +45° w.r.t. z-axis, are shown. More specifically, FIG. 6a shows a first configuration 600 including four possible SA orientations (606, 607, 608, and 609) of the TR 602 for the third LCoS panel 603 orientation wherein the LCoS SA 604 is located in quadrant 4 substantially orthogonal to the fast axis 605. FIG. 6b shows a second configuration 620 including four possible SA orientations (626, 627, 628, and 629) of the TR 622 for the fourth LCoS panel 623 orientation wherein the LCoS SA 624 is located in quadrant 2 substantially orthogonal to the fast axis 625. FIG. 6c shows a third configuration 640 including four possible SA orientations (646, 647, 648, and 649) of the TR 642 for the first LCoS panel 643 orientation wherein the LCoS SA 644 is located in quadrant 3 substantially orthogonal to the fast axis 645. FIG. 6d shows a fourth configuration 660 including four possible SA orientations (666, 667, 668, and 669) of the TR 662 for the second LCoS panel 663 orientation wherein the LCoS SA 664 is located in quadrant 1 substantially orthogonal to the fast axis 665. The four possible optical system configurations, which are referred to as 600, 620, 640 and 660, are mirror images (about the y-axis) of configurations 500, 520, 540 and 560, respectively. Note that although a LH-XYZ coordinate system with CCW positive azimuthal angle convention has been adopted for depicting the orientations of the TR and LCoS slow axes, the orientations as indicated actually mean that the optic-axis of the O-plate birefringent media (in LCoS and possibly in TR devices) is tilted towards the +z direction, w.r.t. the incident light.

Figure 7:
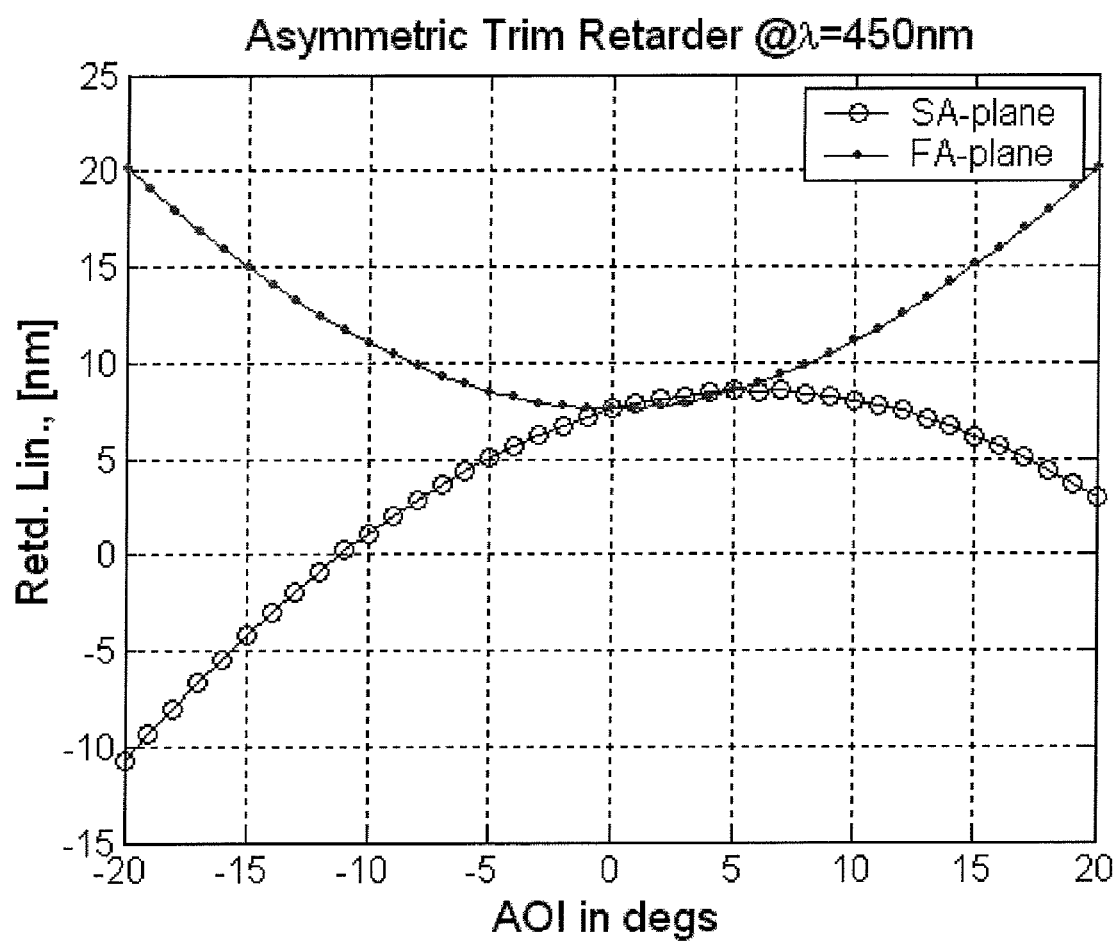
FIG. 7 shows the net linear retardance profile of an asymmetric trim retarder compensator along its principal axes.
Figure 8:
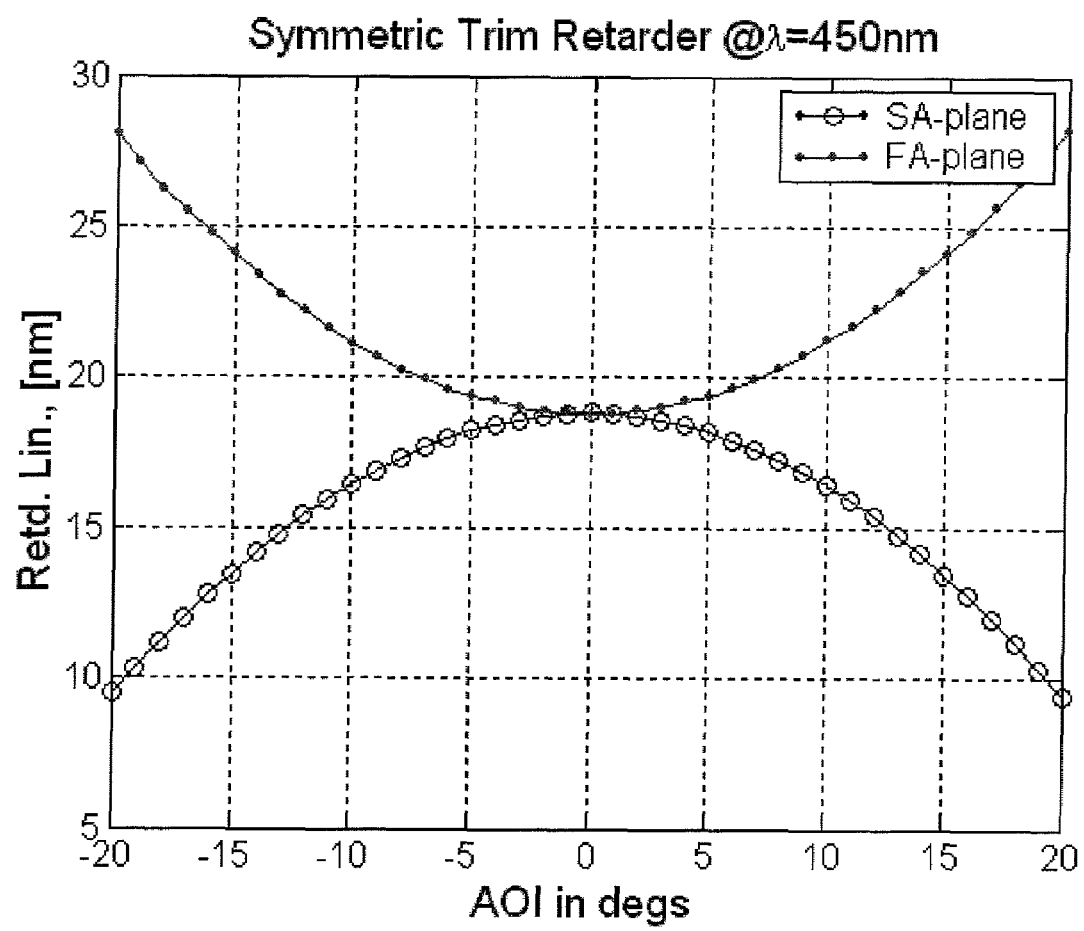
FIG. 8 shows the net linear retardance profile of a symmetric trim retarder compensator along its principal axes.
Figure 9:
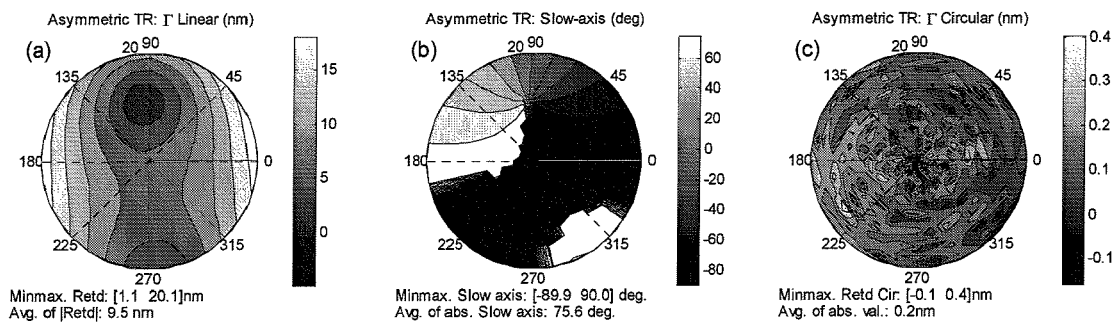
FIG. 9 shows conoscopic viewing maps of experimental retardance components for an asymmetric trim retarder.
Figure 10:
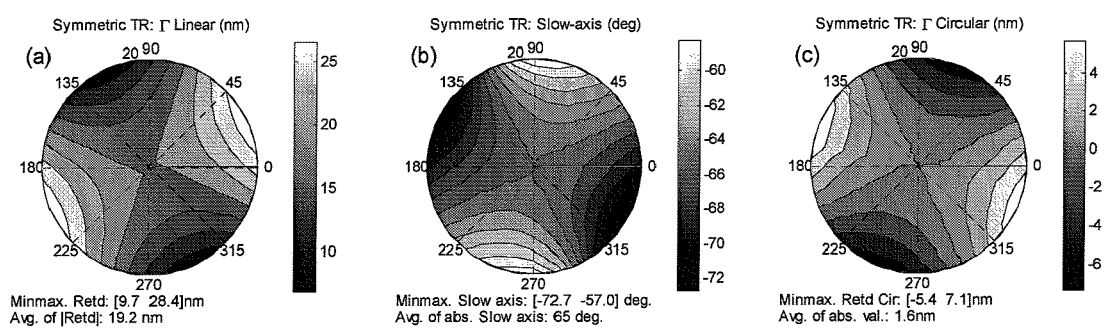
FIG. 10 shows conoscopic viewing maps of experimental retardance components for a symmetric trim retarder.

Since the numerical model does not predict substantially different contrast levels for the differing TR clocking angles, without incorporating the role of tilted WGP in the model, experimental data has been used to quantify the system performance. The experiments used a f/2.4 convergent cone of light. Although there are 32 possible configurations involving the orientations of three elements (WGP, TR and LCOS), the mirror properties between the configurations shown in FIGS. 5 and 6 were used to eliminate 16 non-unique configurations. Moreover, two variants of trim retarder compensator were used. The first type of TR has an asymmetric profile of net linear retardance vs. angles of incidence (AOI), when measured along its SA-plane. This type of profile may, for example, be given by a tilted uniaxial O-plate or a tilted biaxial O-plate. The second type of TR has a symmetric linear retardance profile vs. AOI along its SA-plane. The SA- and FA-plane net linear retardance profiles for the asymmetric and symmetric TRs are shown in FIGS. 7 and 8 respectively. Referring to FIG. 7, the asymmetric TR shows a peak linear retardance at about 5° AOI. In general, the asymmetric retarder will contain a tilted structure, either as an inhomogeneous uniaxial O-plate/—C-plate cascade or a homogeneous tilted biaxial O-plate. Referring to FIG. 8, the two-axis profiles of the symmetric TR are mirrored about normal incidence. This experimental data was collected with an Axometrics Axoscan Mueller matrix polarimeter at $\lambda=450$ nm. This wavelength, which is approximately at the center of the blue band, was selected due to the dramatic difference between contrast ratios for various TR orientations as illustrated in Table 3. The single-pass transmitted retardance components (i.e., linear retardance, linear retarder axis and circular retardance) for the asymmetric and symmetric TR examples are shown in FIGS. 9 and 10, respectively. The SA orientation of the asymmetric retarder at normal incidence is approximately aligned at −85°, w.r.t. RH-XYZ coordinate system when viewing the beam head-on. The SA orientation of the symmetric retarder at normal incidence is approximately aligned at −65°, w.r.t. RH-XYZ coordinate system when viewing the beam head-on. The asymmetric TR does not show any significant circular retardance, up to ±20° AOI over all viewing azimuths. However, the symmetric TR example shows up to 7 nm of circular retardance magnitude at $\lambda=450$ nm, over the same viewing cone.

The experimental contrast results were collected with a PR-705 spectro-radiometer. The intensities at light-off and light-on states were weighted photopically in the blue color band ($\lambda=430$ to 490 nm). The VAN-LCoS panel was not driven in the light-off state. These results are listed in Tables 4a-d for configurations 500, 520, 540 and 560, respectively. The experimental results for configurations 600, 620, 640 and 660 were derived from the configurations for 500, 520, 540, and 560, respectively, taking into account the mirror symmetry in the optical configurations.

TABLE 4(a)

Experimental contrast measurements in the blue-band for optical configuration 500.
Configuration 500

| TR SA | Contrast ratio (asymmetric TR) | Contrast ratio (symmetric TR) |
|---|---|---|
| 506 | 4100 | 4400 |
| 507 | 3400 | 2700 |
| 508 | 4400 | 4000 |
| 509 | 3700 | 2600 |

TABLE 4(b)

Experimental contrast measurements in the blue-band for optical configuration 520.
Configuration 520

| TR SA | Contrast ratio (asymmetric TR) | Contrast ratio (symmetric TR) |
|---|---|---|
| 526 | 3600 | 3300 |
| 527 | 3300 | 2400 |
| 528 | 4200 | 3500 |
| 529 | 3300 | 2400 |

TABLE 4(c)

Experimental contrast measurements in the blue-band for optical configuration 540.
Configuration 540

| TR SA | Contrast ratio (asymmetric TR) | Contrast ratio (symmetric TR) |
|---|---|---|
| 546 | 3100 | 2400 |
| 547 | 4400 | 3400 |
| 548 | 3200 | 2300 |
| 549 | 3400 | 3800 |

TABLE 4(d)

Experimental contrast measurements in the blue-band for optical configuration 560.
Configuration 560

| TR SA | Contrast ratio (asymmetric TR) | Contrast ratio (symmetric TR) |
|---|---|---|
| 566 | 4000 | 2200 |
| 567 | 4700 | 4100 |
| 568 | 3400 | 2600 |
| 569 | 4300 | 4500 |

TABLE 5(a)

Experimental contrast measurements in the blue-band for optical configuration 600.
Configuration 600

| TR SA | Contrast ratio (asymmetric TR) | Contrast ratio (symmetric TR) |
|---|---|---|
| 606 | 3400 | 2700 |
| 607 | 4100 | 4400 |

TABLE 5(a)-continued

Experimental contrast measurements in the
blue-band for optical configuration 600.
Configuration 600

| TR SA | Contrast ratio (asymmetric TR) | Contrast ratio (symmetric TR) |
|---|---|---|
| 608 | 3700 | 2600 |
| 609 | 4400 | 4000 |

TABLE 5(b)

Experimental contrast measurements in the
blue-band for optical configuration 620.
Configuration 620

| TR SA | Contrast ratio (asymmetric TR) | Contrast ratio (symmetric TR) |
|---|---|---|
| 626 | 3300 | 2400 |
| 627 | 3600 | 3300 |
| 628 | 3300 | 2400 |
| 629 | 4200 | 3500 |

TABLE 5(c)

Experimental contrast measurements in the
blue-band for optical configuration 640.
Configuration 640

| TR SA | Contrast ratio (asymmetric TR) | Contrast ratio (symmetric TR) |
|---|---|---|
| 646 | 4400 | 3400 |
| 647 | 3100 | 2400 |
| 648 | 3400 | 3800 |
| 649 | 3200 | 2300 |

TABLE 5(d)

Experimental contrast measurements in the
blue-band for optical configuration 660.
Configuration 660

| TR SA | Contrast ratio (asymmetric TR) | Contrast ratio (symmetric TR) |
|---|---|---|
| 666 | 4700 | 4100 |
| 667 | 4000 | 2200 |
| 668 | 4300 | 4500 |
| 669 | 3400 | 2600 |

These experimental results invalidate the common belief that the four possible orientations of a TR for a given LCoS panel orientation are equal. The differential results are illustrated for each panel orientation, each TR orientation, and each WGP orientation in the blue band. These conclusions can be extended to all color bands in the visible wavelength region.

Referring to contrast ratios measured for the subsystem including an asymmetric TR, there is generally one optimal TR orientation for each panel orientation, regardless of how the WGP is oriented. In each case, the optimal TR orientation is aligned such that the slow-axis of the trim retarder at normal incidence is closest to the linear polarization input into the system. Slow axis orientation here refers to the azimuth with a positive uniaxial director tilt in a RH-XYZ coordinate system and negative uniaxial director tilt in a LH-XYZ coordinate system.

When the A-plate retardance of the trim retarder is moderately greater than the A-plate retardance of the LCoS panel, the SA of the TR is substantially parallel to the incoming linear polarization to the optical system (for example within ±30° or more preferably within ±15° of the x-axis in the optical set-ups illustrated here). For each VAN-LCoS panel orientation and having chosen the SA orientation closest to the incoming polarization, the optimal TR SA location is selected within a particular $1/8^{th}$ circle as listed in Table 6(a).

TABLE 6(a)

Azimuthal angle range for optimal compensation of a VAN-LCoS
panel cascaded with an asymmetric trim retarder compensator,
where each azimuthal angle range is nearly 45° extended
from the closest P-polarization axis. A nominal 1 degree offset
from the S- and P-polarization bisector has been quoted.

| Configuration | TR [$\phi_R$] | LCoS [$\phi_L$] |
|---|---|---|
| 500 & 640 | 0° → −44° | −135° |
| 520 & 660 | 136° → 180° | 45° |
| 540 & 600 | −136° → −180° | −45° |
| 560 & 620 | 0° → 44° | 135° |

In the case of a symmetric TR, the slow axis is not readily distinguished from its 180° rotated orientation. The experimental contrast results in the blue band indicate that the SA of the TR at normal incidence should be aligned closest to the incoming linear polarization. Both the chosen TR SA orientation and its 180° rotated version give a contrast performance within the measurement noise. The two optimal TR SA locations are selected within a particular $1/8^{th}$ circle as listed in Table 6(b).

TABLE 6(b)

Azimuthal angle range for optimal compensation of a VAN-LCoS
panel cascaded with a symmetric trim retarder compensator, where
each azimuthal angle range is nearly 45° extended from
the closest P-polarization axis. A nominal 1° offset from
the S- and P-polarization bisector has been quoted.

| Configuration | TR [$\phi_R$] | LCoS [$\phi_L$] |
|---|---|---|
| 500 & 640 | 0° → −44°<br>136° → 180° | −135° |
| 520 & 660 | 0° → −44°<br>136° → 180° | 45° |
| 540 & 600 | 0° → 44°<br>−136° → −180° | −45° |
| 560 & 620 | 0° → 44°<br>−136° → −180° | 135° |

Note that reference is only made to the slow-axis orientations of the trim retarder compensator and the VAN-LCoS panel, without regard to the aspect ratio of the two devices. For a given WGP orientation in each color channel and an asymmetric TR, there exist up to three TR orientations with approximately equal highest contrast values, for some panel SA locations (e.g., configuration 560 with −45° WGP orientation and configuration 660 with +45° WGP orientation). Any one of the three TR orientations may be selected. In other orientations of the panel SA, there might only be a single optimal TR SA orientation (e.g., configuration 520 with −45° WGP orientation and configuration 620 with +45° WGP orientation). The optimal SA orientation, within one $1/8^{th}$ circle region for an asymmetric TR and within two $1/8^{th}$ circle regions for a symmetric TR, as outlined in Tables 6a and 6b, respectively, allow for substantially equal image contrast performance regardless of the orientation of WGP and the orientations of LCoS panel SA in a projection system.

The nominal SA of the VAN-LCoS panel has been nominally pegged at ±45° and ±135°. In practice, there is a small tolerance range of this nominal SA orientation. The tolerance is typically within ±15°, more preferably within ±10° and still more preferably within ±5° deviation from the above mentioned VAN-LCoS panel nominal SA orientations. These small azimuthal angle deviations of panel SA orientations from the intended SP-bisector in a given quadrant has no impact on the optimal TR SA orientation regions reported in Table 6(a) and (b).

Figure 11A:
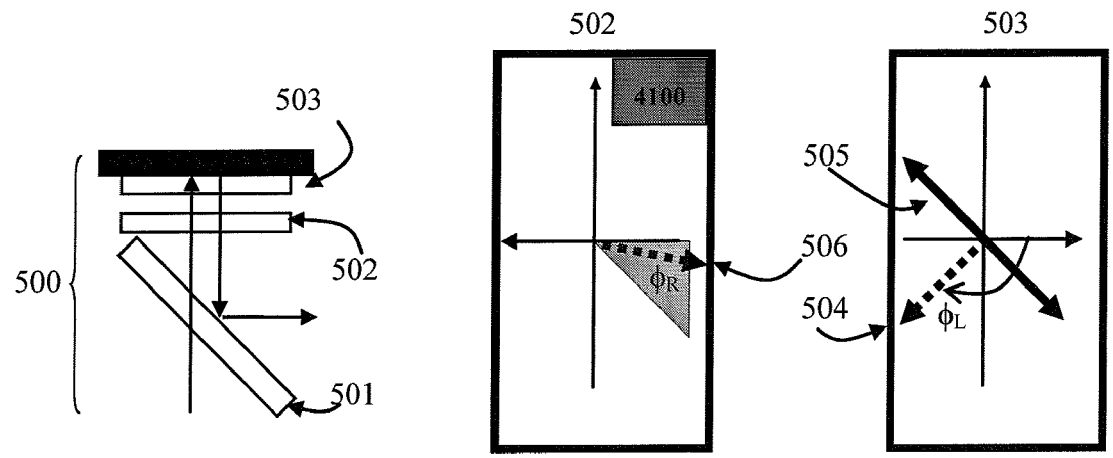
FIG. 11a is a schematic diagram illustrating the optimal range of the slow axis of an asymmetric trim retarder for panel orientation #1 and a WGP tilted at −45 degrees.
Figure 11B:
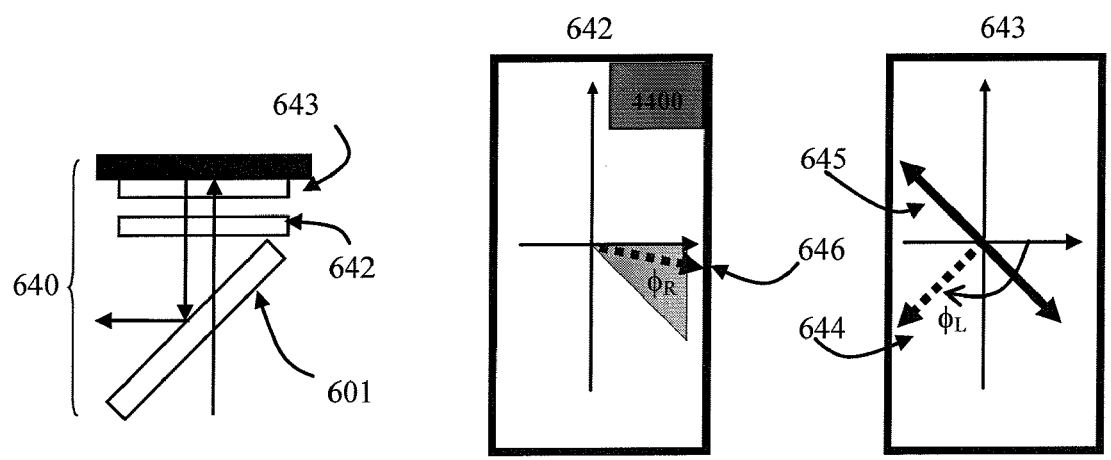
FIG. 11b is a schematic diagram illustrating the optimal range of the slow axis of an asymmetric trim retarder for panel orientation #1 and a WGP tilted at +45 degrees.
Figure 12A:
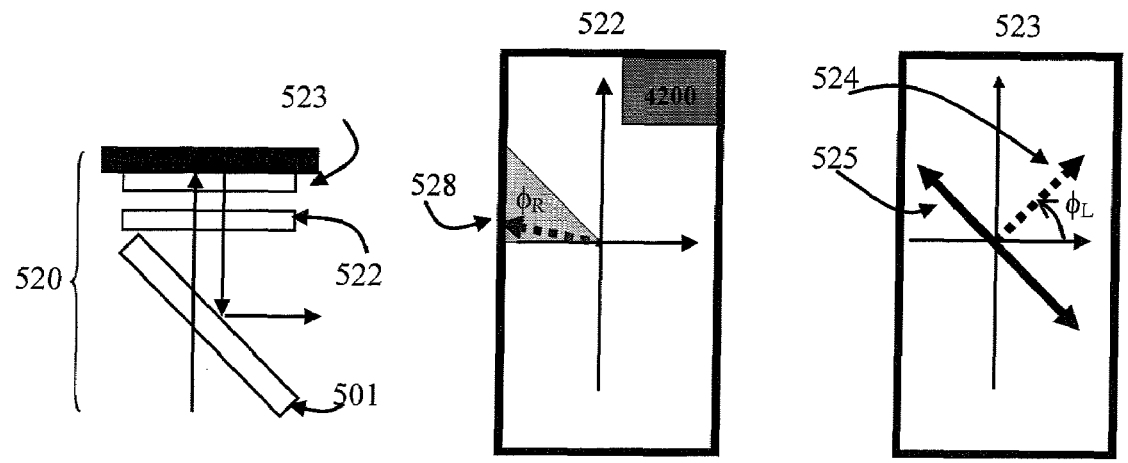
FIG. 12a is a schematic diagram illustrating the optimal range of the slow axis of an asymmetric trim retarder for panel orientation #2 and a WGP tilted at t −45 degrees.
Figure 12B:
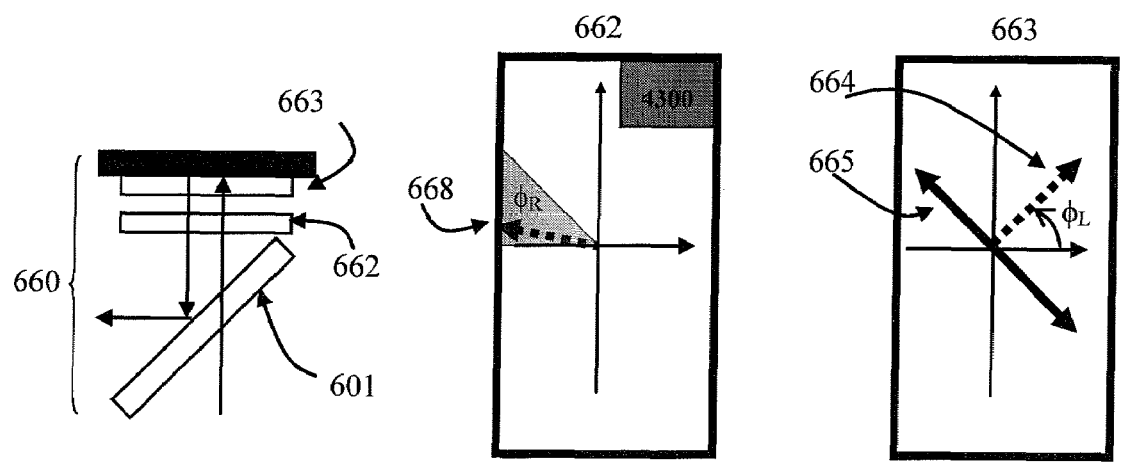
FIG. 12b is a schematic diagram illustrating the optimal range of the slow axis of an asymmetric trim retarder for panel orientation #2 and a WGP tilted at +45 degrees.
Figure 13A:
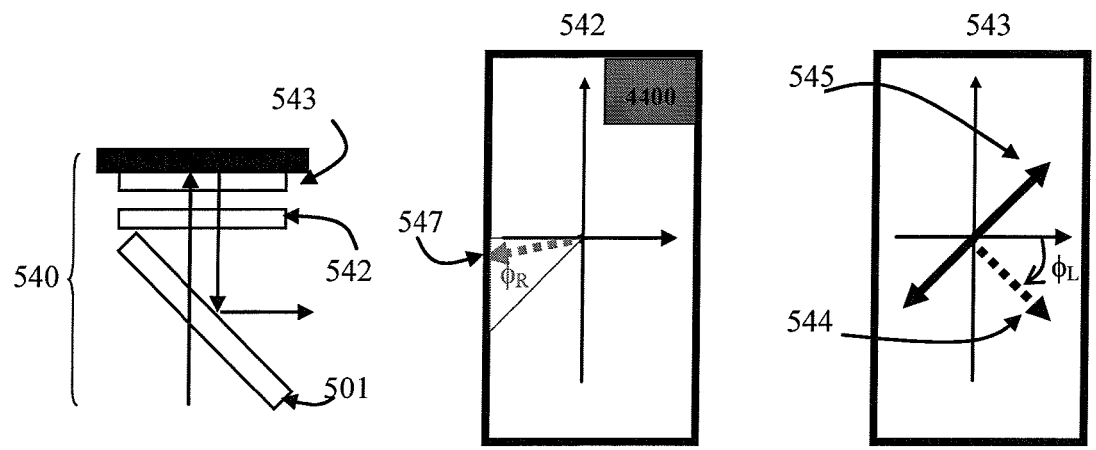
FIG. 13a is a schematic diagram illustrating the optimal range of the slow axis of an asymmetric trim retarder for panel orientation #3 and a WGP tilted at −45 degrees.
Figure 13B:
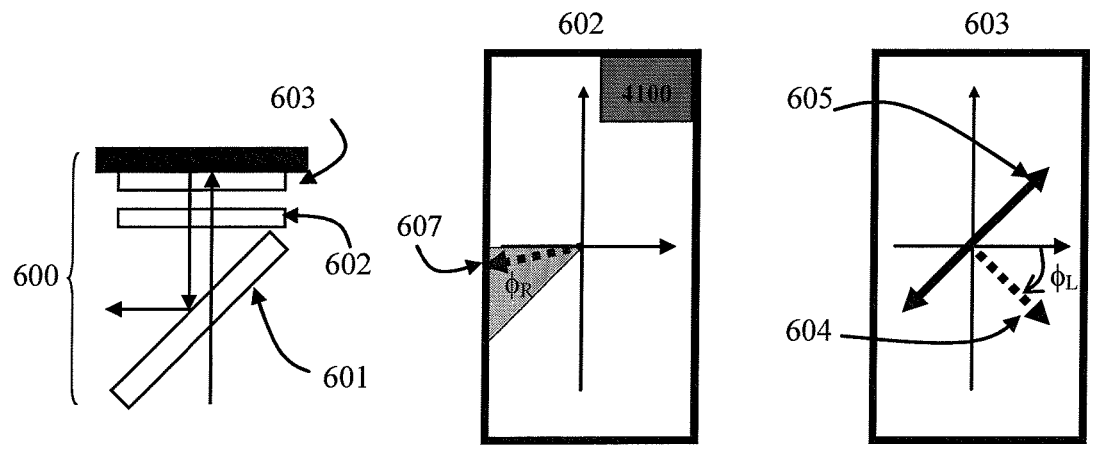
FIG. 13b is a schematic diagram illustrating the optimal range of the slow axis of an asymmetric trim retarder for panel orientation #3 and a WGP tilted at +45 degrees.
Figure 14A:
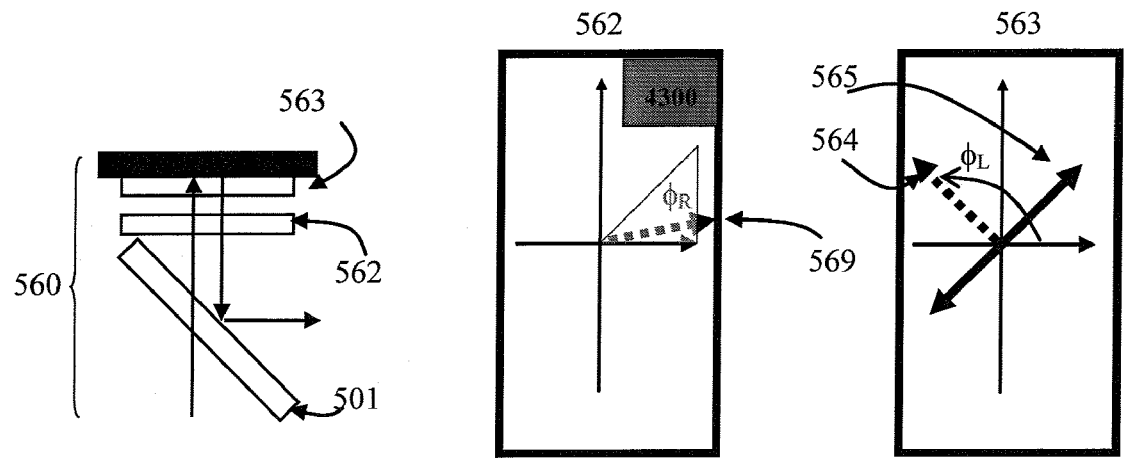
FIG. 14a is a schematic diagram illustrating the optimal range of the slow axis of an asymmetric trim retarder for panel orientation #4 and a WGP tilted at −45 degrees.
Figure 14B:
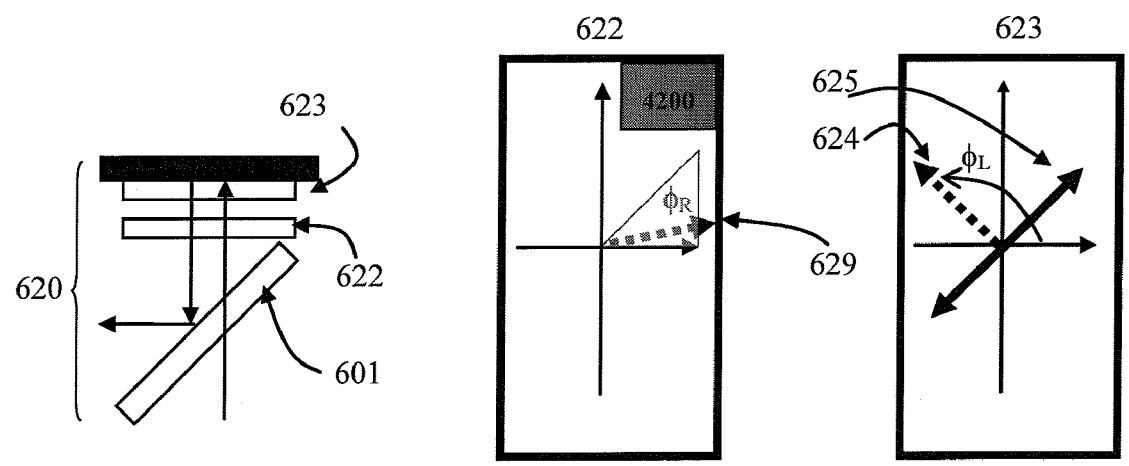
FIG. 14b is a schematic diagram illustrating the optimal range of the slow axis of an asymmetric trim retarder for panel orientation #4 and a WGP tilted at +45 degrees.

The optimal range of the TR SA orientation for all four VAN-LCoS panel orientations is shown in FIGS. 11a/b, 12a/b, 13a/b, and 14a/b when the TR is an asymmetric TR. For each LCoS orientation, there is generally only one TR SA orientation that provides a global contrast maxima. The choice of this orientation in the shaded region (i.e., within the predetermined ⅛ circle) provides an optimal orientation that allows for substantially equal contrast performance with any one of the LCoS panel SA orientations, for both WGP orientations.

The sole optimal orientation for an asymmetric trim retarder in each optical configuration has its SA azimuthal angle located in a quadrant that is mirrored to the quadrant location of the LCoS panel SA about the y-axis. The y-axis is also the axis of rotation for the two WGP orientations (±45° tilt w.r.t. z-axis). The optimal TR SA orientation is contained within $\frac{1}{8}^{th}$ of the circle, nearest to the incoming polarization axis, in the quadrant that is mirrored to the quadrant location of the LCoS panel SA. This observation is valid for all values of TR A-plate retardance, up to a halfwave. Beyond a halfwave TR A-plate value, the role of slow- and fast-axes switches. For compensating a VAN-LCoS panel with a low in-plane retardance, it is typical to use a TR with an A-plate value ranging from 0 nm to about quarterwave, more preferably, 0 nm to $\frac{1}{10}^{th}$ wave and still more preferably $\frac{1}{50}^{th}$ wave, as referenced at λ=550 nm.

If the anti-reflection properties of the trim retarder are sufficiently similar off the front and the rear surface of the device, the asymmetric trim retarder optimally oriented for configurations 500 and 640 (i.e., panel orientation #1) can be transformed to optimally compensate for configurations 540 and 600 (i.e., panel orientation #3) and vice versa, if the trim retarder is rotated about the x-axis by 180°. In other words, the marked SA location is mirrored about the x-axis. However, since sense of the oblique tilt of the panel is inverted the SA orientation with reference to positive tilt (w.r.t. z-axis) has a further 180° azimuthal offset. Similarly, the optimal asymmetric TR orientations for configurations 520 and 660 (i.e., panel orientation #2) and configurations 560 and 620 (i.e., panel orientation #4) are mirrored, linked by a rotation about the x-axis of 180°.

Figure 15A:
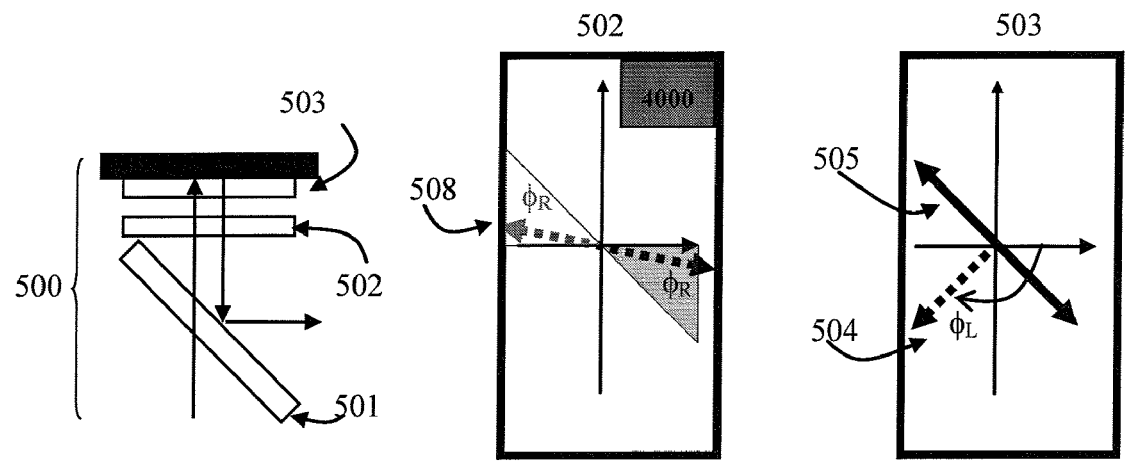
FIG. 15a is a schematic diagram illustrating the optimal ranges of the slow axis of a symmetric trim retarder for panel orientation #1 and a WGP tilted at −45 degrees.
Figure 15B:
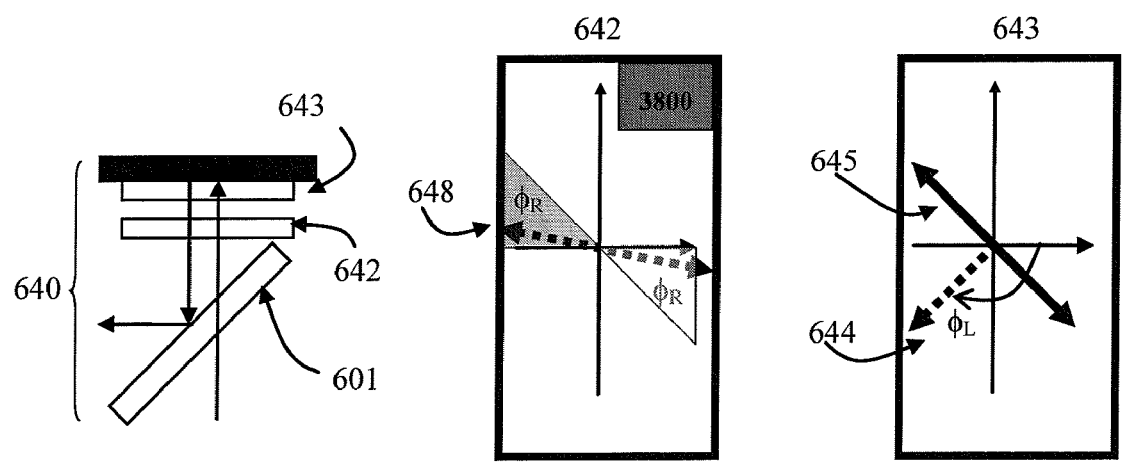
FIG. 15b is a schematic diagram illustrating the optimal ranges of the slow axis of a symmetric trim retarder for panel orientation #1 and a WGP tilted at +45 degrees.
Figure 16A:
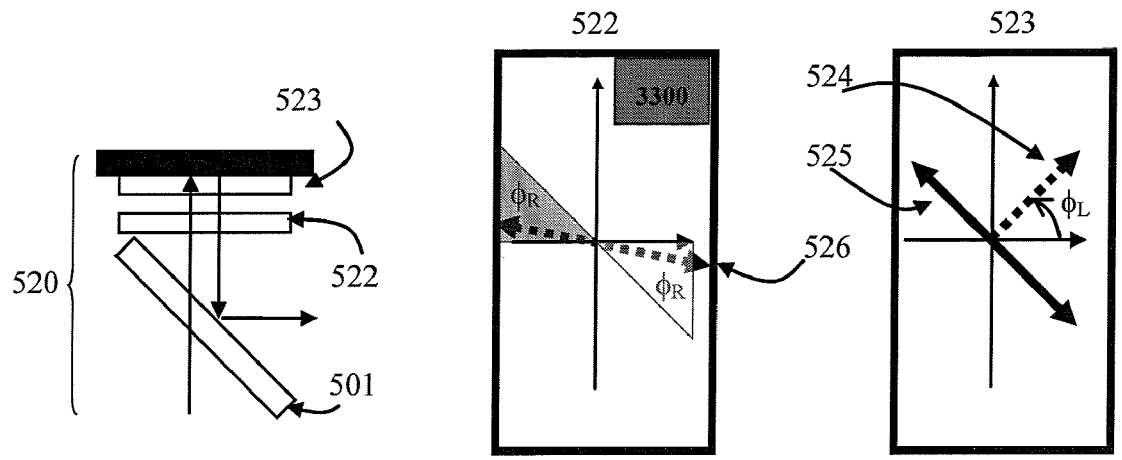
FIG. 16a is a schematic diagram illustrating the optimal ranges of the slow axis of a symmetric trim retarder for panel orientation #2 and a WGP tilted at −45 degrees.
Figure 16B:
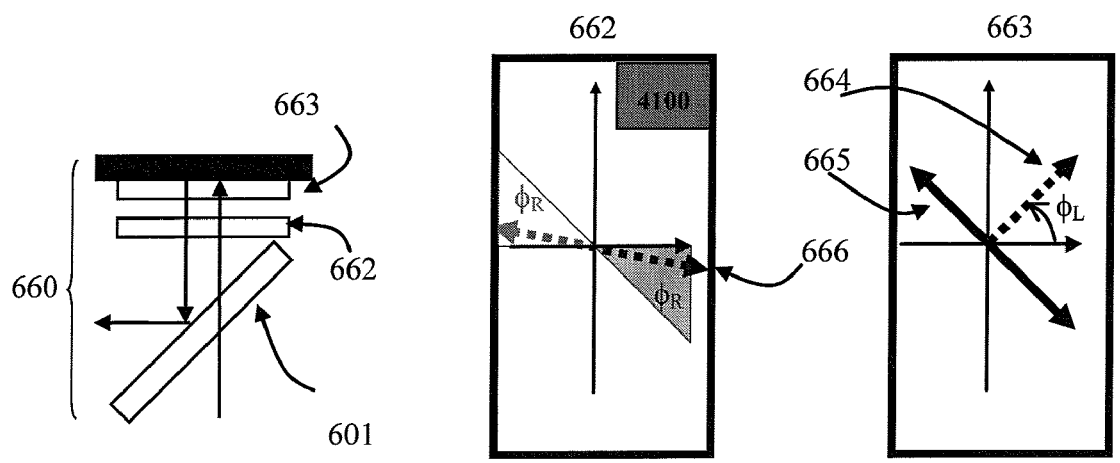
FIG. 16b is a schematic diagram illustrating the optimal ranges of the slow axis of a symmetric trim retarder for panel orientation #2 and a WGP tilted at +45 degrees.
Figure 17A:
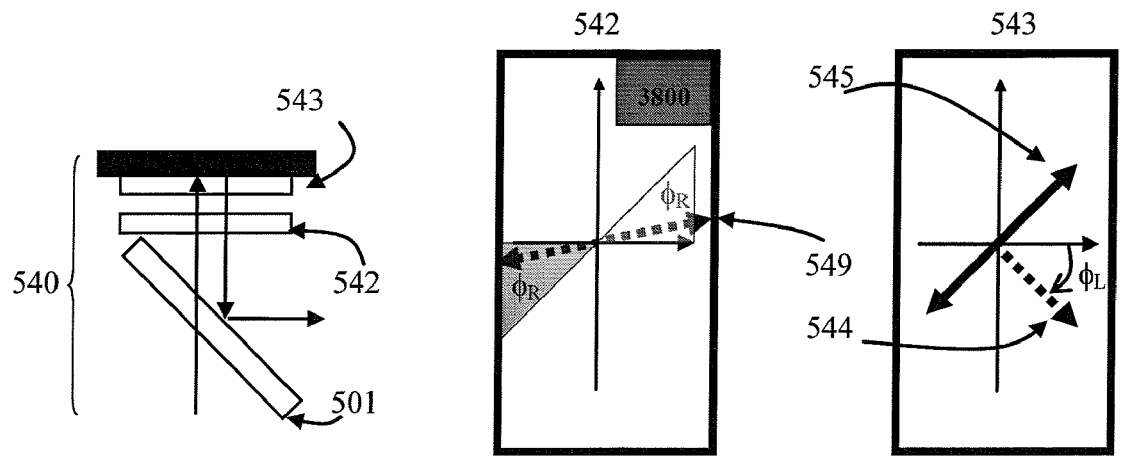
FIG. 17a is a schematic diagram illustrating the optimal ranges of the slow axis of a symmetric trim retarder for panel orientation #3 and a WGP tilted at −45 degrees.
Figure 17B:
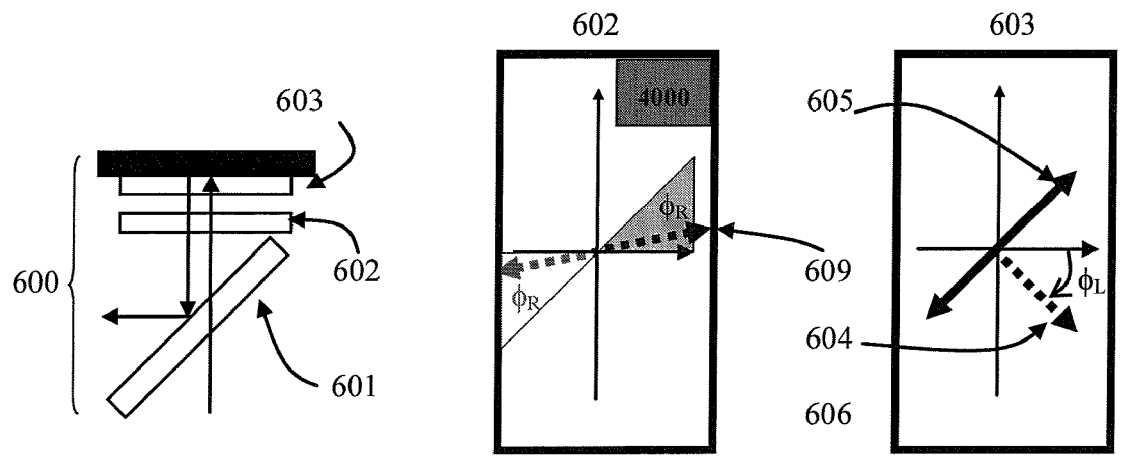
FIG. 17b is a schematic diagram illustrating the optimal ranges of the slow axis of a symmetric trim retarder for panel orientation #3 and a WGP tilted at +45 degrees.
Figure 18A:
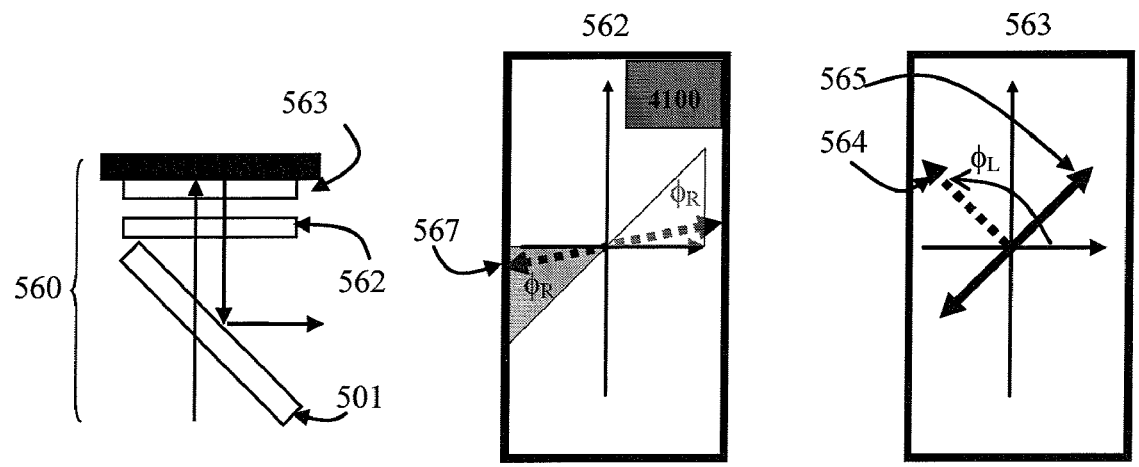
FIG. 18a is a schematic diagram illustrating the optimal ranges of the slow axis of a symmetric trim retarder for panel orientation #4 and a WGP tilted at −45 degrees.
Figure 18B:
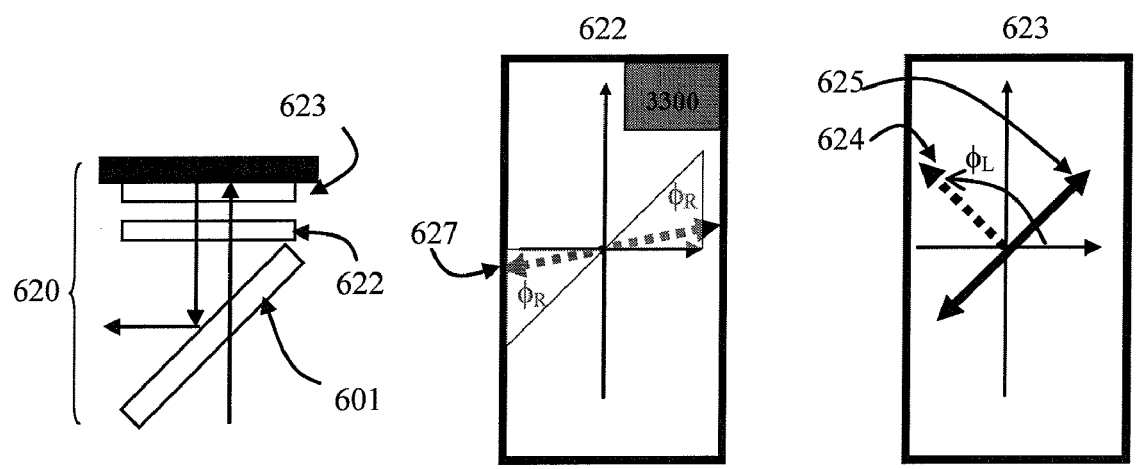
FIG. 18b is a schematic diagram illustrating the optimal ranges of the slow axis of a symmetric trim retarder for panel orientation #4 and a WGP tilted at +45 degrees.

The graphical representations of the optimal TR SA orientations with a symmetric TR are given in FIGS. 15a/b, 16a/b, 17a/b and 18a/b. There are two SA orientations of the TR for substantially equal contrast performance, for each LCoS panel SA orientation. These two optimal orientations are substantially parallel to the incoming linear polarization. The regions for these two orientations have been marked as shaded ⅛ circles closest to the incoming linear polarization.

Note that the choice of WGP orientation makes a difference in the absolute contrast numbers at the optimal TR SA locations, when the TR is a symmetric TR. For example, referring to Tables 4b and 5d, the experimental contrast measurements in the blue-band shows a maximum of 3500 for configuration 520 and a maximum of 4500 for configuration 660, both of which use panel orientation #2. In comparison, there is a relatively small difference (i.e., between 4200 and 4300 for configurations 520 and 660, respectively) when the TR is an asymmetric TR.

The experimentally observed differences in system contrast between varying trim retarder orientations was further examined by modeling the VAN-LCoS panel and WGP.

Figure 19:
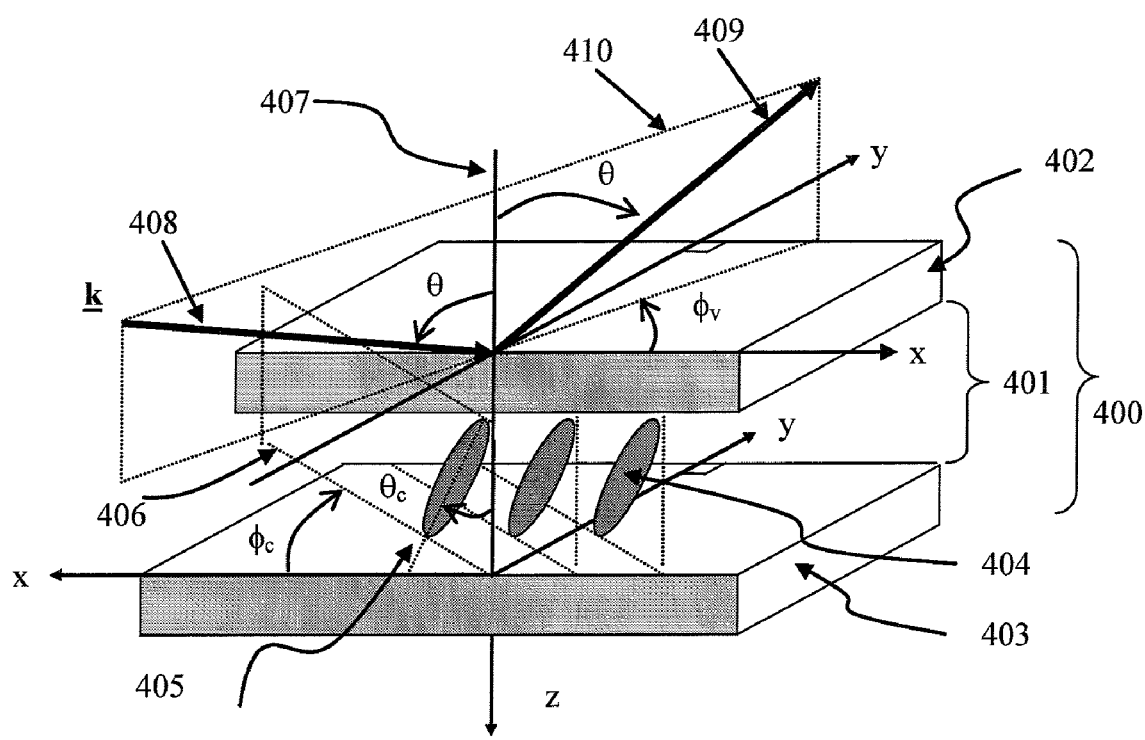
FIG. 19 is a schematic diagram of a VAN-LCoS panel shown in the RH-XYZ coordinate system.

The VAN-LCoS panel used in the projection display was modeled as an obliquely aligned LC device (i.e., an O-plate configuration). FIG. 19 shows an example of an LC cell 400 in an obliquely aligned LCoS device. The LC layer 401 is sandwiched between a cover glass 402 and a silicon substrate 403. Very-large scale integration (VLSI) electronic circuits and optical-quality reflective electrodes (e.g., aluminum mirrors, not shown) are fabricated on the top surface of the substrate 403. The applied voltages at the mirrors drive the LC molecules 404, with a counter transparent electrode on the cover glass 402 providing the other electrical contact. In the light-off state, the long-range averaged LC directors 405 are slightly tilted from the device normal (z-direction) 407. This polar angle $\theta_c$ has a projection onto the device plane at an azimuthal angle $\phi_c$. The azimuthal plane is also the tilt-plane 406. Note that the polar angle $\theta_c$ is a positive angle w.r.t to the +z-axis and is constrained to a value between 0 and 90°. The azimuthal angle $\phi_c$ of the LC director is defined within a 360° range. The tilt-plane and the polar angles are shown with a "RH-XYZ" coordinate system in FIG. 19. The pair of $(\theta_c, \phi_c)$ angles uniquely specifies the orientation of the average LC director. The LCoS device is illuminated with a substantially on-axis cone (i.e., the cone axis is parallel to the device normal). The plane of incidence 410 contains the wavevector 408 where it is inclined at a polar angle θ w.r.t. the device normal 407. With a reflective device such as the LCoS, it is convenient to show the viewing angles in a LH-XYZ coordinate system. The incident wavevector is reflected as 409. This viewing plane (which is at 180° azimuthal angle difference to the plane of incidence) makes an angle $\phi_v$ with the x-axis of the LH-XYZ system. Similarly, the pair of $(\theta, \phi_v)$ angles uniquely specifies the viewing position.

The LC mixtures used in the VAN-LCoS panels are positive uniaxial materials with a negative dielectric anisotropy. Some examples of these types of LC mixtures include Merck MLC-6608 and MLC-6610. At an applied electric field, the LC directors are rotated towards the device plane. At a light-off-state, the LC cell is driven below the threshold voltage required for switching or is not driven at all. The LC directors are nearly homeotropic in the light-off-state. The small pre-tilt angle is typically set to between 5° and 10° to avoid disclination of the LC directors, to be less affected by fringe-field switching, and to speed up the switching response at normal operation. The tilt-plane of the VAN-LCoS corresponds to the slow-axis plane. With the O-plate structure in the VAN-LCoS panel, the azimuthal angle containing the positive tilt of the LC molecules was determined. The LC pre-tilt in VAN-LCoS was assumed homogeneous across the thickness of the cell. For a transmissive device, this O-plate structure does not produce any meaningful circular retardance over the entire viewing cone (for example, up to ±30° polar angles). However, the homogenous O-plate structure gives rise to measurable circular retardance on reflection.

Figure 20:
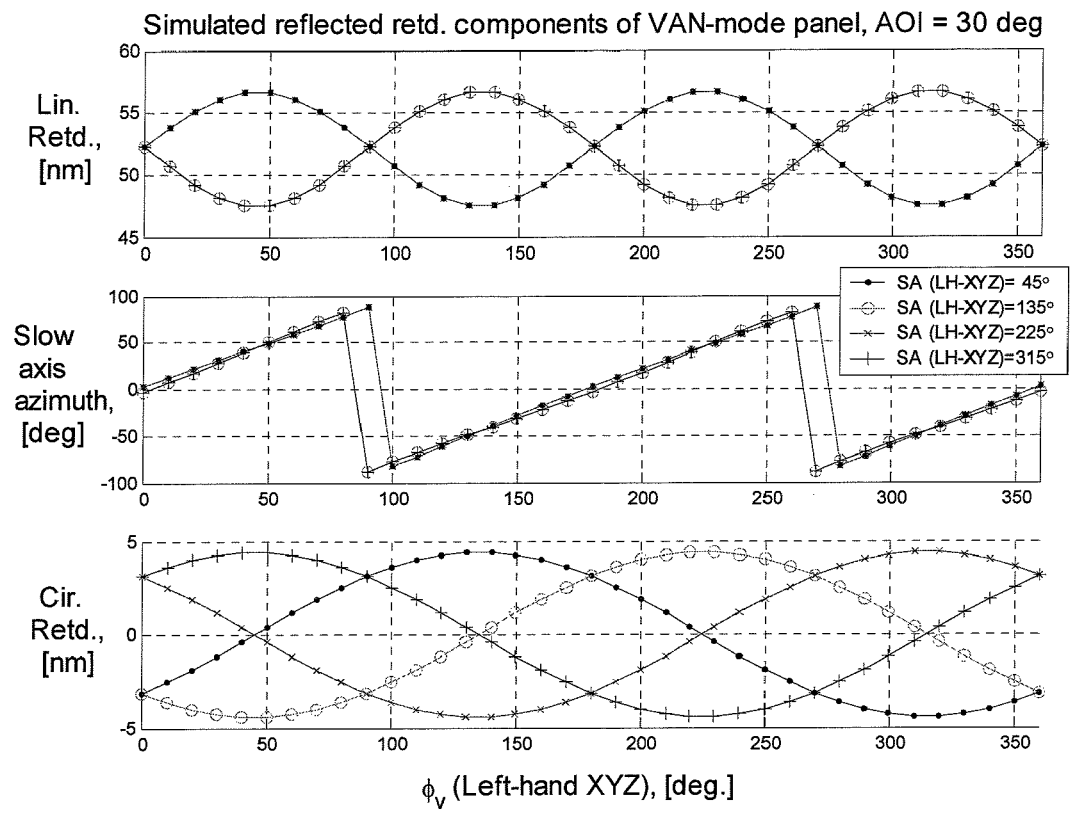
FIG. 20 illustrates the simulated reflected retardance components of a VAN-LCoS panel for the determination of the slow-axis orientation with respect to reflection RH-XYZ or incidence LH-XYZ coordinate systems.

FIG. 20 illustrates the simulated reflected retardance components of the modeled VAN-LCoS panel for the determination of the slow-axis orientation having the positive tilt. More specifically, FIG. 20 shows a simulation of the VAN-LCoS at 30° AOI for all azimuthal viewing planes. When the viewing plane coincides with the tilt plane, the observer (or the measuring instrument) sees the largest linear retardance but no circular retardance. This is the plane containing the slow-axis of the LC cell. Conversely, when the viewing plane coincides with the fast-axis plane (orthogonal to the tilt plane), the observer sees a dip in the linear retardance while the circular retardance magnitude is the largest. Circular retardance is assigned positive and negative signs, associated with left-handed and right-handed circular polarization, respectively. This convention conforms to the natural nomenclature discussed in Yeh et al., "Optics of liquid crystals displays," John Wiley & Sones, New York. The plot shows the locations of ± circular retardance signs for [45°, 135°, 225°, 315°] LH-XYZ of LCoS SA orientations (the tilt-plane of the LC having a positive polar angle w.r.t. z-axis).

Figure 21:
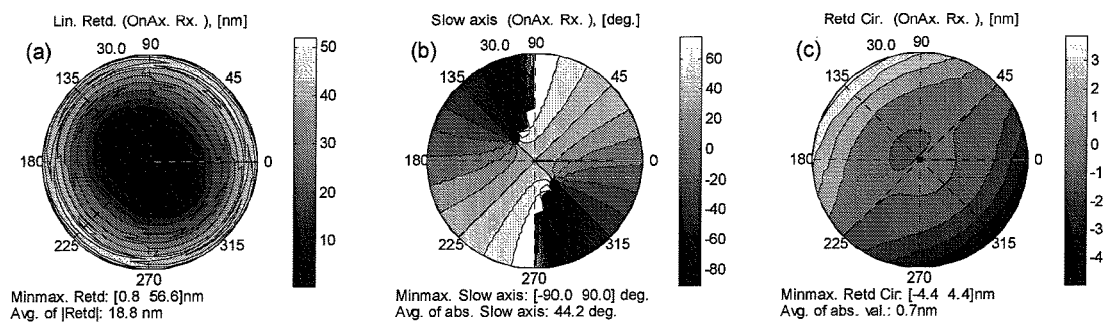
FIG. 21 shows simulated conoscopic circular retardance maps of a VAN-LCoS panel with a 4.5° pretilt and retardance components of 2 nm/250 nm A-plate/C-plate @λ=550 nm.

FIG. 21 gives the LCoS retardation components for viewing cone up to ±30° polar angles. These retardance components: linear retardance, retardation axis and circular retardance are shown in (a), (b) and (c), respectively. The LC director in the LCoS model is located at 135° (w.r.t. RH-XYZ convention) and thus the SA lies along the north-east/south-west line (w.r.t. LH-XYZ viewing cone). While it is possible to determine the VAN-LCoS tilt plane by the linear retardance map, it is not possible to discern the sense of LC positive vs. negative tilt unless the circular retardance map is utilized. The circular retardance magnitude is nearly zero along the SA plane. Along the orthogonal azimuthal plane, the circular retardance reaches a maximum magnitude. The sign of the maximum circular retardance magnitude is positive at 90-deg. CCW viewing azimuth rotation, and negative at 90-deg. CW viewing azimuth rotation, from the VAN-LCoS SA azimuth with positive LC director tilt, (rotation in LH-XYZ coordinate system). At about 30° off-axis illumination, the magnitude of circular retardance can be measured readily. In this simulation, the VAN-LCoS has a 4.5° pre-tilt and linear retardance components of 2 nm/250 nm A-plate/C-plate@$\lambda$=550 nm, and its LC director has a positive tilt oriented at $\phi_c$=135° (RH-XYZ coordinate system). Since the conoscopic circular retardance map is shown for reflection viewing, the slow axis is located at 45° azimuth (LH-XYZ coordinate system).

Clearly there is an absence of a single axis of symmetry parallel to the normal incidence of the LCoS panel when the net reflected retardance profile of the panel is plotted versus polar and azimuthal viewing angles. This lack of symmetry is believed to at least be part of the reason the four local contrast maxima corresponding to the four possible over-clocked angles of the trim retarder(s) are not equal.

As discussed above, the two-stage model, which includes a trim retarder and a VAN-LCoS panel, does not predict the dependencies of compensation efficacy w.r.t. trim retarder SA orientations (i.e., the four possible over-clocking angles provide approximately the same compensation). Moreover, the input polarizer and output analyzer in the model were not birefringent, although suitable polarization extinction ratios were included. In a high performance LCoS system, a wiregrid PBS is utilized to provide for wide wavelength band and wide angle acceptance. In addition to the loss (lower throughput efficiency), a second undesirable aspect of the WGP is the phase retardance of the device.

In fact, the WGP is a birefringent device having an effective medium theory (EMT) indicatrix (although its primary function is still one of beam splitter and polarizer). The WGP indicatrix, in projection applications, is tilted from the nominal system XY plane. Clearly, the WGP possesses a birefringence property that impacts the residual retardance compensation of VAN-LCoS panel. At normal incidence, the very high extinction ratio should eliminate the birefringence effects. However, in a cone application, and especially on reflection, skew ray effects become a limiting factor in achieving the intrinsic contrast of a TR/LCoS pair.

Figure 22:
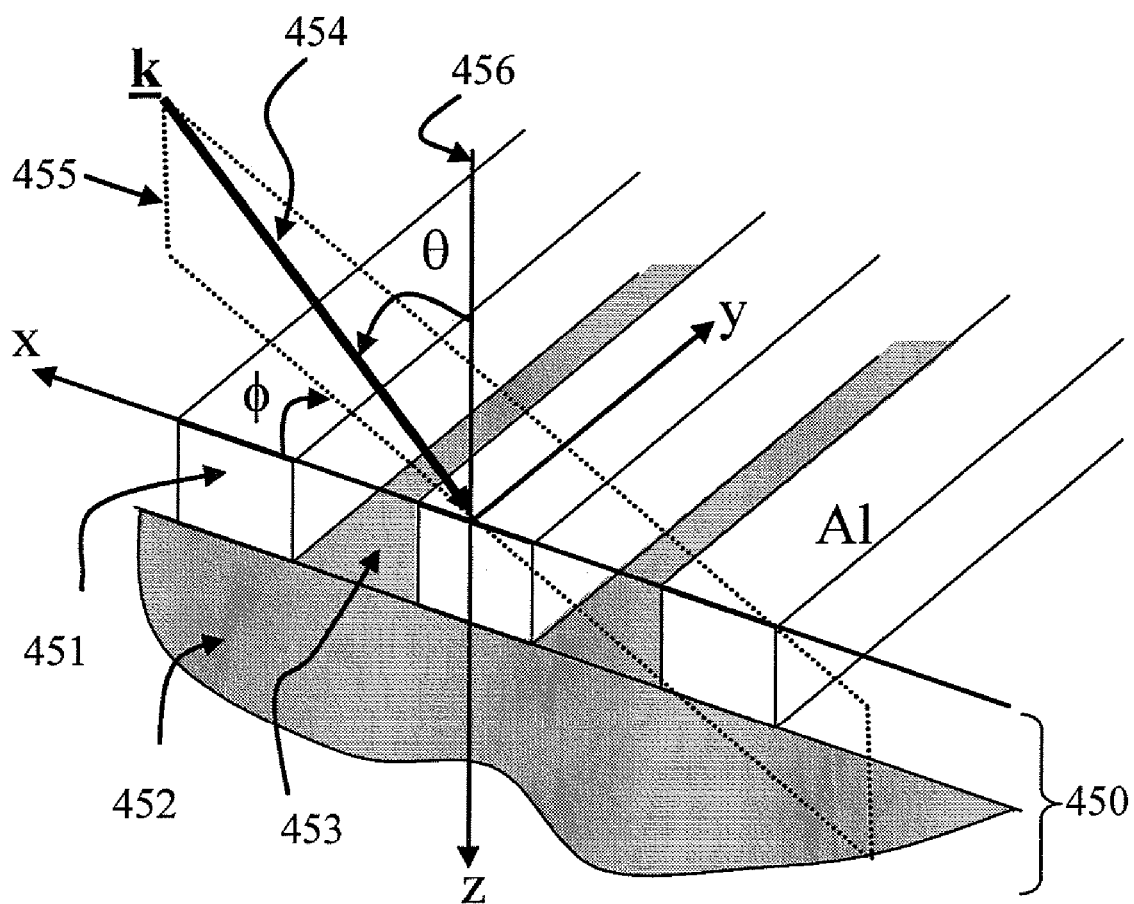
FIG. 22 is a schematic diagram of a WGP with the wire side facing the incidence (shown in RH-XYZ coordinate system)

The modeled wiregrid 450 is shown schematically in FIG. 22. A series of parallel microwires 451 are deposited on a glass substrate 452 to form a one-dimensional grating. The grating vector is aligned parallel to the x-axis. In the simulation it was assumed that air 453 fills the gap between the wires. The incident wavevector 454 is shown at θ polar angle w.r.t. device normal 456. The wavevector is contained within the plane of incidence 455. This plane of incidence makes an azimuthal angle of $\phi$ w.r.t. x-axis. A RH-XYZ coordinate system is utilized. In the light engine set-up, the glass substrate 452 is typically oriented to face the light source (not shown). The incoming light is passed through the WGP 450 from glass 452 to grating 451 as a convergent cone. On second pass, the divergent cone is incident on the wire side and the reflection of the wiregrid 451 is deflected towards the analyzer/projection lens.

Figure 23:
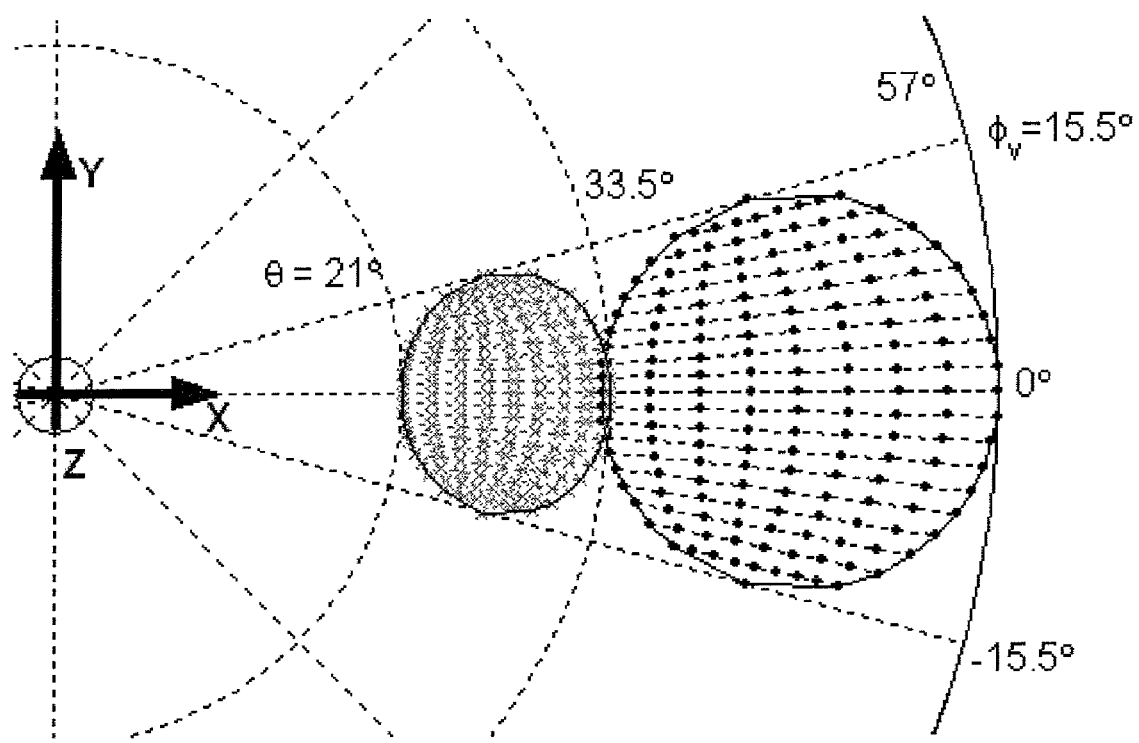
FIG. 23 is shows a cone sampling of a 45° tilted WGP in air, wherein lines with '.' markers denote the cross-section of the cone (a circle) w.r.t. cone-axis as a function of polar and azimuthal angle offset from the device normal and lines with 'x' markers denote the new sample cone in 1.52 index glass.

The polar and azimuthal angle offsets of the cone illumination, with respect to the WGP device normal are shown in FIG. 23. In the simulation, it was assumed that a f/2.4 cone (~12° half cone width in air) was used and that the WGP was rotated at 45° about the y-axis (RH-XYZ convention). The total azimuthal angle range is approximately ±15.5° (given by arcsine of half-cone width divided by the WGP tilt angle) whereas the largest AOI span ranges from 33° to 57°. The AOI range is dependent on the selected viewing azimuth. The azimuthal planes are the local planes of incidence. When the cone refracts into a glass medium, each azimuth of samples is maintained, but the ray angles are reduced by Snell's law. The cross-section of the cone in the glass medium is oval, with extended cone width along the axis of rotation (y-axis). The AOI range along the principal plane of incidence (i.e., XZ-plane) ranges from 21° to 33.5°, approximately, for a glass index of 1.52.

One such WGP in a conical mount has been modeled. The microwires are assumed to have 150 nm of width, with 170 nm of depth and 47% duty cycle ratio of wires vs. grating period. There are no additional coating layers above or beneath the wires. The model, which was modeled using software such as GSolver from Grating Solver Dev. Corp., PO Box 353, Allen, Tex. 75013, used a combination of modal-analysis and rigorous coupled-wave analysis to compute the vector diffraction outputs of the wiregrid grating. Owing to the short grating pitch within the visible wavelength band, this grating produced only a zeroth order for both transmission and refection (other orders are evanescent). In the device calculation, up to ±20 orders were retained. The complex amplitude electric fields of the 0R and 0T orders (zeroth orders in reflection and transmission, respectively) are then transformed to the global 'S' and 'P' coordinate frame. The required Jones 2×2 matrices for transmission and reflection were computed. The Jones matrices were decomposed into an elliptical polarizer (diattenuator) followed by an elliptical retarder.

The aluminum wiregrid was modeled as a tabulated list of (n,k) complex indices (e.g., from the Handbook of optical constants of solids, Ed. E. D. Palik, Academic Press, Orlando, 1985). Some examples of optical constants for the Al layer, as well as the glass substrate, are provided in Table 7.

TABLE 7

Optical constant of Aluminum layer and Glass substrate used in modeling the WGP.

| Materials | Blue band (450 nm) | Green band (550 nm) | Red band (650 nm) |
|---|---|---|---|
| Al | 0.626-5.506i | 0.974-6.723i | 1.499-7.835i |
| Glass | 1.5248 | 1.5208 | 1.5158 |

Figure 24:
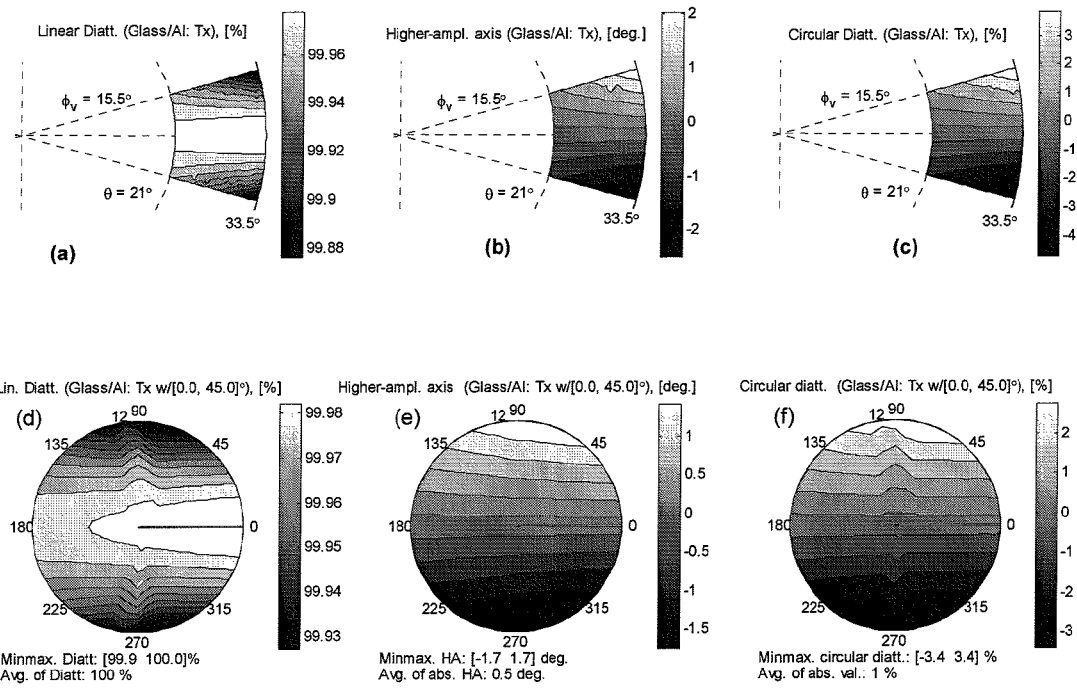
FIG. 24 illustrates the diattenuation components of a WGP used at 45° tilt, wherein the diattenuation parameters are shown as a function of device normal centered coordinate axes (top half) and as a function of cone-axis centered coordinate axes (bottom half), covering the required convergent f/2.4 sampling cone for transmission from glass to wiregrid.
Figure 25:
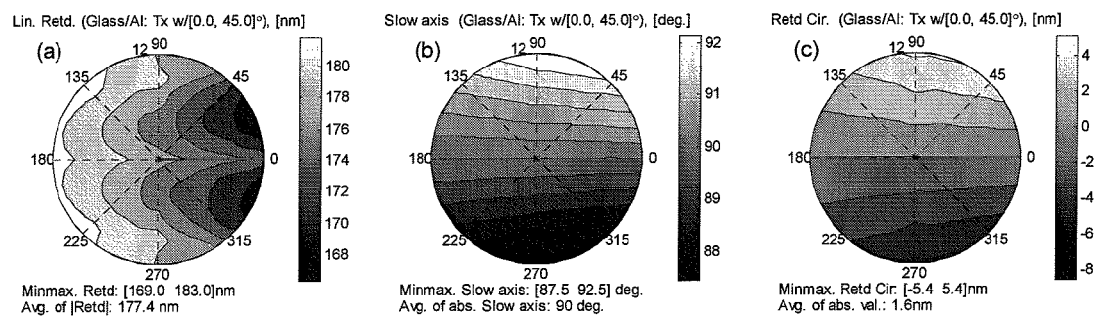
FIG. 25 illustrates the retardation components of a WGP used at 45° tilt covering the required convergent f/2.4 sampling cone for transmission from glass to wiregrid.

In the first pass through the WGP in transmission (from glass to wires), the diattenuation and retardation components of the transmitted field are shown in FIGS. 24 and 25, respectively. The calculation has been performed at λ=450 nm, with θ ranging from 21° to 33.5° in glass and the viewing azimuths $\phi_v$ ranging from −15.5° to +15.5°. The diattenuation components according to these calculation angle ranges are shown in the top half of FIG. 24, where (a) is a linear diattenuation map, (b) is a transmitted polarizer axis map and (c) is a circular diattenuation map, each map covering at least f/2.4 sampling cone for transmission from glass to wiregrid. A uniform angle step in both the polar and azimuthal directions has been utilized. This segment of the viewing cone is slightly larger than the refracted (actual) cone in glass (the actual refracted cone in FIG. 23 is at tangent to the four sides of the cone segment centered at device-normal). The sharp corners of the segment do not represent ray angles in the actual cone of light and these data points are neglected. The diattenuation components within the viewing cone are shown in the bottom half of FIG. 24, where (d) is a linear diattenuation map, (e) is a transmitted polarizer axis map, and (f) is a circular diattenuation map, each map covering only the required f/2.4 sampling cone for transmission from glass to wiregrid. These latter three viewing cone coordinates are referenced to the cone-axis in air.

The linear diattenuation of the WGP in transmission is very high, nearly 100% as shown in FIG. 24(d). The linear diattenuation axis is termed 'higher-amplitude' axis (HA), to avoid the confusion of transmission and absorption axes used in traditional absorptive and wiregrid reflective polarizers. For the WGP, with its grating vector parallel to the x-axis, the HA orientation for the transmitted field is substantially aligned parallel to the global 'P' polarization and the HA orientation for the reflected field is substantially aligned parallel to the global 'S' polarization. The HA azimuth angles deviate from the P-polarization as the cone rays deviate from the principal plane of incidence (i.e., away from $\phi_v$=0° or 180°). FIG. 24(e) indicates that there could be as much as ±1.7° of diattenuator axis change, for a typical f/2.4 cone in air. Similarly, the circular diattenuation picks up at non-principal plane incidences. Within the equivalent of f/2.4 cone in air, the circular diattenuation of the WGP in transmission reaches approximately ±3.4%.

The corresponding simulated retardation results are shown in FIG. 25, including a linear retardance map (a), a slow axis map (b), and a circular retardance map (c), where each map covers the required sampling f/2.4 cone. For a WGP used as glass to wire transmission, the linear retardance magnitude is rather uniform at any viewing position. The results at λ=450 nm, indicates a 0.4 waves of linear retardance (~177 nm retardance vs. 450 nm wavelength). The slow axis map indicates a similar, but not identical, distribution of linear retarder axis distribution when compared to linear diattenuator axis distribution. The slow axis is distributed over 90°±2.5° within an equivalent of f/2.4 cone in air. It is noted that the polar decomposition method adopted here assumes a diattenuator followed by a retarder. This means that the light in transmission is linearly polarized with a HA axis ranging from 0°±1.7° within an equivalent f/2.4 cone in air, and that this linear polarized light is then affected by about 0.4 waves of linear retardance with a slow-axis distribution of 90°±2.5° within the same cone. The circular retardance of the WGP in transmission ranges to +5.4 nm at the extreme vertical azimuths of the f/2.4 cone (λ=450 nm).

Figure 26:
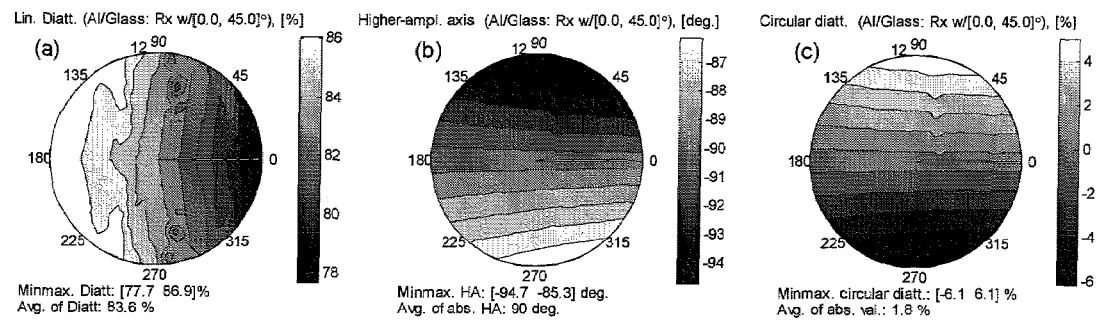
FIG. 26 illustrates the diattenuation components of a WGP used at 45° covering the required convergent f/2.4 sampling cone for reflection from air to wiregrid.
Figure 27:
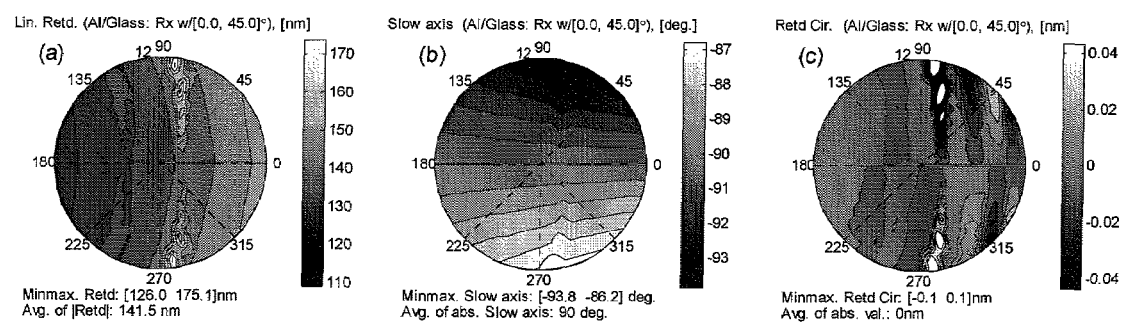
FIG. 27 illustrates the retardation components of a WGP used at 45° tilt covering the required convergent f/2.4 sampling cone for reflection from air to wiregrid.

On second pass, after the input light has been double-passed through the trim retarder and the LCoS panel, the reflection field properties of the WGP (from air to glass) are of interest. The simulated diattenuation and retardation characteristics of an f/2.4 cone (in air) in the reflected field are shown in FIGS. 26 and 27, respectively. The diattenuation characteristics of the WGP in second pass (refection) are poorer than its first pass transmission diattenuation (glass to wires). Referring to FIG. 26, the linear diattenuation map (a) shows that the linear diattenuation is now severely dependent on the view cone position (ranging from approximately 78% to 87% from the largest AOI to the smallest AOI, or about 57° to 33° AOI in air). The slow axis map (b) shows that the linear diattenuator axis ranges up to ±4.7°, within the f/2.4 cone (vs. ±1.7° range in the first pass). The circular diattenuation map (c) shows that the circular diattenuation is also of larger magnitude than the circular diattenuation in the transmitted first pass, at up to ±6.1% within the f/2.4 cone.

The significantly poorer reflection diattenuation characteristics are compounded by poor reflection retardation properties. The linear retardance map (a) in FIG. 27 shows that within the nominal f/2.4 cone, the net linear retardance changes from approximately 125 nm to 175 nm, referenced at λ=450 nm, for AOI ranging from 33° to 57° in air. This clearly indicates an O-plate birefringence, with respect to cone axis. The tilt of the wiregrid equivalent indicatrix has been aligned at about ±45° w.r.t. system XY plane. Note that, the simulation has been performed as a convergent cone. In the light engine, the second pass at the WGP uses a divergent cone, this means the diattenuation and retardation properties are rotated by 180° azimuth, about its cone axis. Referring again to FIG. 27, the slow-axis distribution of the reflected field (b) varies up to ±3.8°, slightly worse than the transmitted first pass, whereas circular retardance (c) is not present in the reflected field.

It is noted that the birefringence compensation in a VAN-LCoS based projection system is appreciably affected by the presence of a WGP at a nominal ±45° tilt w.r.t. system z-axis. The first pass through the wiregrid (from glass to aluminum), introduces non-negligible circular retardance into the already linearly polarized light beam. The retardation property of the WGP in transmission resembles a negative uniaxial A-plate (with a very small optic axis tilt). This property has been exploited such that the WGP is rotated in-plane, and used as a compensator.

It is also noted that for a trim retarder element that also shows viewing-cone dependent circular retardance, some orientations of the trim retarder element would be less optimal when the sign of the circular retardance in each quadrant of the viewing cone is not arranged appropriately. This explains the variations in the actual compensated panel contrast values, obtained with a symmetric retarder having non-negligible circular retardance.

After traversing the trim retarder compensator NAN-LCoS panel devices in double-pass, the light again strikes the WGP from the air-side. The reflected field is of importance here. Simulation results of the retardation characteristics of the WGP in reflection indicate that a substantially O-plate uniaxial birefringence is obtained, without any circular retardance. The O-plate has an optic axis contained within the WGP device tilt-plane. The variation in linear retardance, with respect to the cone axis, in particular when the slow-axis deviates from the system 'S' and 'P' principal planes, drives the requirement to complement the tilt of WGP birefringence with those of the LCoS and TR devices.

If the wiregrid is used in reverse orientation (substrate side facing the light source), it is expected that the reflected field would show an O-plate birefringence. Again, the trim retarder should be oriented appropriately in order to realize the very high system contrast ratios.

The retardation properties of the WGP at ±45° tilt w.r.t. z-axis are rather dispersive with wavelength of operation. The net retardance over the cone has been modeled to be less than a halfwave at λ=450 nm. The magnitude of this retardance reaches about halfwave (and higher) at λ=550 and 650 nm, for some of polar viewing angles within an f/2.4 cone in air. In each wavelength illumination, the reflected field of the WGP has an associated equivalent O-plate birefringence.

Clearly the geometrical arrangement of the WGP at ±45° with respect to the z-axis imposes asymmetry, in addition to the asymmetry in VAN-mode LCoS retardance profiles, that is believed to contribute to the fact that the four local contrast maxima corresponding to the four possible over-clock angles of the trim retarder(s) are not necessarily equal. Furthermore, if the trim retarder exhibits asymmetry in the net retardance profile along its slow-axis plane, as for example illustrated in FIG. 7, this addition asymmetry may also contribute to the fact that the four local contrast maxima corresponding to the four possible over-clocked angles of the trim retarder(s) are not equal.

In accordance with the instant invention, the trim retarder is clocked to an optimal azimuthal orientation such that the overall system contrast is substantially unaffected by the azimuthal location of the slow axis in the liquid crystal display panel and/or the orientation of the WGP.

For example, with respect to the former, when an asymmetric trim retarder is clocked such that the slow-axis of the trim retarder at normal incidence is close to parallel to the polarization axis of the incident light and the wire grid is orientated at −45°, then the measured contrast levels listed in Tables 4a-d include 4100, 4400, 3600, 4200, 4400, 3400, 4700, and 4300 for the four different panel orientations. The difference in measured contrast levels is further reduced by selecting the starting over-clocking angle to be in a quadrant that is mirrored to the quadrant location of the SA of the LCD panel about an axis perpendicular to the polarization axis of the incident light (i.e., the y-axis). With this restriction, and as summarized in the top right corner of the trim retarders in FIGS. 11a, 12a, 13a, and 14a, the measured contrast levels include 4100, 4200, 4400, and 4300. Clearly, the trim retarder in each of these four configurations is clocked to an optimal azimuthal orientation that results in an overall system contrast that is substantially unaffected by the azimuthal location of the slow axis in the liquid crystal display panel.

Similarly, when an asymmetric trim retarder is clocked such that the slow-axis of the trim retarder at normal incidence is close to parallel to the polarization axis of the incident light and the wire grid is orientated at +45°, then the measured contrast levels listed in Tables 5a-d include 4100, 4400, 3600, 4200, 4400, 3400, 4700, and 4300 for four different panel orientations. Again, this difference in measured contrast levels is further reduced by selecting the starting over-clocking angle to be in a quadrant that is mirrored to the quadrant location of the SA of the LCD panel about an axis perpendicular to the polarization axis of the incident light (i.e., the y-axis). With this restriction, and as summarized in the to right corner of the trim retarders in FIGS. 11b, 12b, 13b, and 14b, the resulting contrast levels are measured as 4400, 4300, 4100, and 4200. Clearly, the trim retarder in each of these four configurations is also clocked to an optimal azimuthal orientation that results in an overall system contrast that is substantially unaffected by the azimuthal location of the slow axis in the liquid crystal display panel. Moreover, in comparing the contrast levels listed in the top right corner of the trim retarders shown in 11a and 11b, 12a and 12b, 13a and 13b, and 14a and 14b, these optimal azimuthal orientations also result in an overall system contrast that is substantially unaffected by the orientation of the WGP.

Advantageously, the instant invention results in a commercially valuable optimization technique that results in consistent overall system contrast levels, thus standardizing the contrast ratio of the product. More specifically, the optimization technique allows a set of trim retarders, diced with their SA oriented in the appropriate optimal region, to be used for differently oriented LCD panels and/or oriented WGPs, in the same or different projection systems, while still maintaining similar contrast levels.

Notably, the optimization technique provided by the instant invention is significantly different than experimentally determining the azimuthal orientation of the trim retarder that corresponds to the highest overall system contrast. For example, in accordance with one embodiment of the instant invention and referring to FIGS. 11a and 11b, the optimal azimuthal angle of an asymmetric trim retarder for a LCoS in panel orientation #1 is between 0 and −44°, regardless of the orientation of the WGP (e.g., this produces similar contrast levels of 4100 and 4400 for configurations 500 and 640, respectively). Referring to Table 4a, the highest experimental contrast measurement for panel orientation #1 and a WGP orientated at −45° is 4400 for trim retarder SA orientation 508, which is between 136 and 180°. Although this SA orientation range (i.e., between 136 and 180°) resulted in a higher experimental contrast measurement than the optimal range (i.e., between 0 and −44°) for a WGP oriented at −45°, if the same range is used for a configuration wherein the WGP is orientated at +45° the resulting contrast measurement is much lower (e.g., 3400 or SA orientation 648).

When a symmetric trim retarder is clocked such that the slow-axis of the trim retarder at normal incidence is closest to the linear polarization transmitted to the LCoS panel then the measured contrast levels listed in Tables 4a-d are 4400, 4000, 3300, 3500, 3400, 3800, 4100, and 4500 for the four panel orientations and a wire grid orientation of −45°. These measured contrast ratios provide a maximum variation of 1200 compared to the maximum variation of 2300 (i.e., orientations 566 vs. 569) when the slow axis of the trim retarder is arbitrarily selected. As a result, the trim retarder in each of these eight configurations is said to be clocked to an optimal azimuthal orientation that provides an overall system contrast that is substantially unaffected by the azimuthal location of the slow axis of the liquid crystal display panel.

Similarly, when a symmetric trim retarder is clocked such that the slow-axis of the trim retarder at normal incidence is closest to the linear polarization transmitted to the LCoS panel then the measured contrast levels listed in Tables 5a-d are 4400, 4000, 3300, 3500, 3400, 3800, 4100, and 4500 for the four panel orientations and a wire grid orientation of +45°. These measured contrast ratios provide a maximum variation of 1200 compared to the maximum variation of 2300 (i.e., orientation 667 vs. 668) when the slow axis of the trim retarder is arbitrarily selected. As a result, the trim retarder in each of these eight configurations is said to be clocked to an optimal azimuthal orientation that provides an overall system contrast that is substantially unaffected by the azimuthal location of the slow axis of the liquid crystal display panel. Notably, in comparing the contrast levels listed in the top right corner of the trim retarders shown in 15a and 15b, 16a and 16b, 17a and 17b, and 18a and 18b, the orientation of the WGP plays a more important role in determining the overall system contrast than in the embodiment wherein the trim retarder is asymmetric.

In accordance with one embodiment of the instant invention, an asymmetric trim retarder selected to compensate for a specific type of LCD panel is positioned between a WGP and the LCD panel and is rotated such that its slow axis is within a predetermined optimal range selected in dependence upon the orientation of the slow axis of the LCD panel. For example, if the slow axis of the LCD panel corresponds to panel orientation #1, then the predetermined optimal range will be between 0 and −44°, whereas if the slow axis of the LCD panel corresponds to panel orientation #2, #3, or #4, then the predetermined optimal range will be between 136 and 180°, −136 and −180°, and 0 and 44°, respectively. Once its slow axis is within the predetermined range, the trim retarder is clocked to the exact optimal azimuthal angle (e.g., using a calculated over-clocking angle and/or experimental fine tuning). Optionally, a second asymmetric trim retarder manufactured with the same parameters as the first trim retarder is positioned between a second WGP and a second LCD panel and is rotated such that its slow axis is within a second predetermined optimal range selected in dependence upon the orientation of the slow axis of the second LCD panel. The first and second trim retarders, WGPs, and LCD panels are either part of different projection systems or different color channels in the same projection system. With regard to the latter, different color channels may have differently oriented WGPs and/or differently oriented LCD panels. Advantageously, this optimization technique results in an overall system contrast is substantially unaffected by the slow axis orientation of the first and second LCDs and/or the orientation of the two WGPs.

Some examples of suitable materials for the asymmetric trim retarder include a) liquid crystal polymer configured as a uniaxial O-plate, with an optional —C-plate element such as a form birefringence coating, b) tilted discotic (negative) uniaxial O-plate (such as Fuji Wideview film) where the —C-plate element is integrated homogeneously with the O-plate element, c) tilted negative biaxial organic foil, such as cellulose acetate compound, where the c-axis of the biaxial medium is tilted from the device normal, d) birefringent crystal (solid) configured as an O-plate (having one or more layers), both positive and negative birefringence crystal may be applicable, e) obliquely coated inorganic thin-film retarder where the resultant equivalent index indicatrix is a tilted uniaxial or biaxial birefringence, and/or f) distorted (or deformed) helix ferroelectric liquid crystal polymer where each LC director is tilted with respect to the device normal but the continuous twist of the LC director as it precesses around the z-axis averages the effective index indicatrix to one of a tilted negative biaxial birefringence. Optionally, an asymmetric trim retarder having a tilted c-axis and having an in-plane retardance component, incorporates an additional —C-plate element by inhomogeneous combination (inhomogeneous retarder).

In accordance with another embodiment of the instant invention, a symmetric trim retarder selected to compensate for a specific type of LCD panel is positioned between the WGP and the LCD panel and is rotated such that its slow axis is within one of two predetermined optimal ranges selected in dependence upon the orientation of the slow axis of the LCD panel. For example, if the slow axis of the LCD panel corresponds to panel orientation #1, then the two predetermined optimal ranges will be 0 to −44° and 136 to 180°, whereas if the slow axis of the LCD panel corresponds to panel orientation #2, #3, or #4, then the predetermined optimal ranges will be 0 to −44° and 136 to 180°, 0 to 44° and −136 to −180°, and 0 to 44° and −136 to −180°, respectively. Once its slow axis is within one of the two predetermined ranges, the trim retarder is clocked to the exact optimal azimuthal angle (e.g., using a calculated over-clocking angle and/or experimental fine tuning). Optionally, a second symmetric trim retarder manufactured with the same parameters as the first trim retarder is positioned between a second WGP and a second LCD panel and is rotated such that its slow axis is within one of two predetermined optimal ranges selected in dependence upon the orientation of the slow axis of the second LCD panel. The first and second trim retarders, WGPs, and LCD panels are either part of different projection systems or different color channels in the same projection system. With regard to the latter, different color channels may have differently oriented WGPs and/or differently oriented LCD panels. Advantageously, this optimization technique results in an overall system contrast is substantially unaffected by the slow axis orientation of the first and second LCDs and/or the orientation of the WGPs.

Some examples of suitable symmetric trim retarders include a) liquid crystal polymer retarder configured as an uniaxial A-plate (optic axis in the plane of the trim retarder device), with an optional —C-plate element such as form birefringence elements, b) a zero-order grating (ZOG) where the grating pitch is substantially shorter than the wavelength of illumination and the grating is equivalent to an effective form-birefringence medium having its optic axis aligned in the plane of the retarder device (where the ZOG may be written on a UV-sensitive layer, with E-beam encoding, or photo-resist patterning and etching of suitable substrate or coated materials), c) non-tilted organic biaxial organic foil, such as cellulose acetate compound, where the c-axis of the biaxial medium is parallel to the display system z-axis, d) Birefringent crystals (solid) configured as an A-plate, both positive and negative birefringence crystal may be applicable, and/or e) obliquely coated inorganic thin-film retarder where the resultant equivalent index indicatrix is a substantially non-tilted uniaxial or biaxial birefringence. Optionally, a symmetric trim retarder having a non-tilted c-axis and having an in-plane retardance component, incorporates additional —C-plate element by inhomogeneous combination (inhomogeneous retarder).

Figure 28:
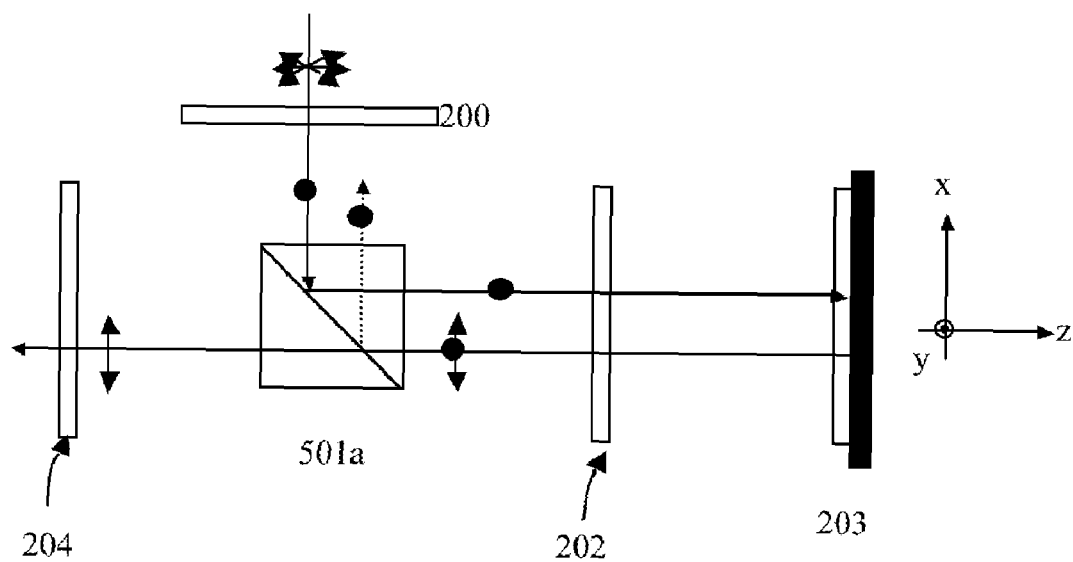
FIG. 28 is a schematic diagram of a subsystem of a multi-panel polarization-based LCoS projection light engine including a MacNeille-type polarization beam splitter (PBS) cube.
Figure 29:
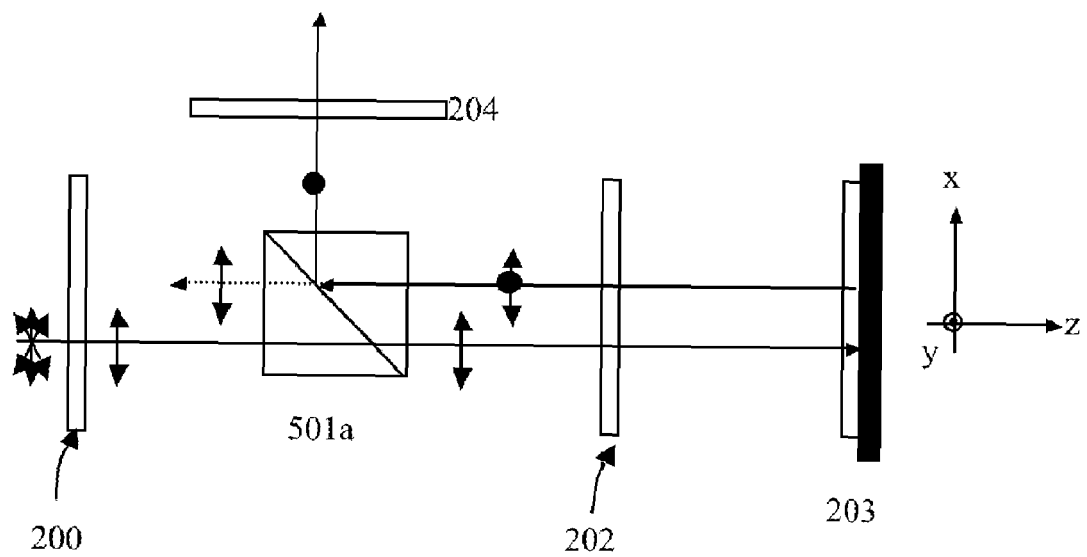
FIG. 29 is a schematic diagram of another subsystem of a multi-panel polarization-based LCoS projection light engine including a MacNeille-type polarization beam splitter (PBS) cube.
Figure 30A:
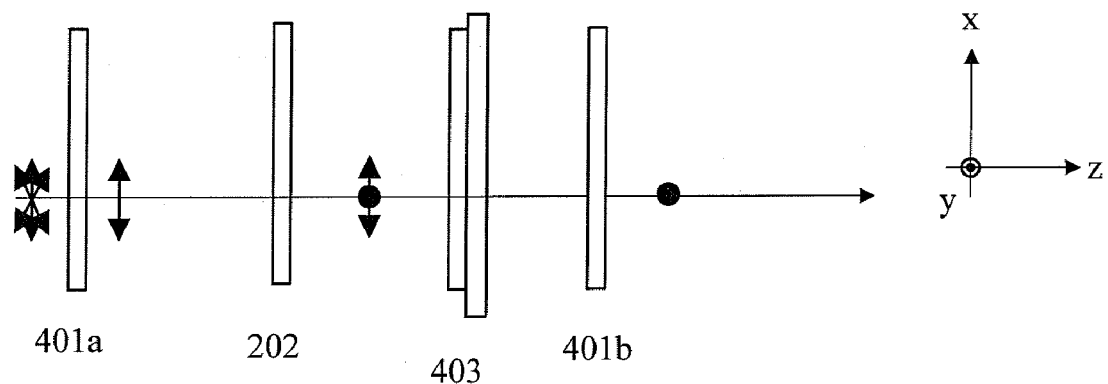
FIG. 30a is a schematic diagram of a subsystem of a multi-panel polarization-based LCD projection light engine wherein the LCD is a TN or VAN-mode transmissive liquid crystal panel.
Figure 30B:
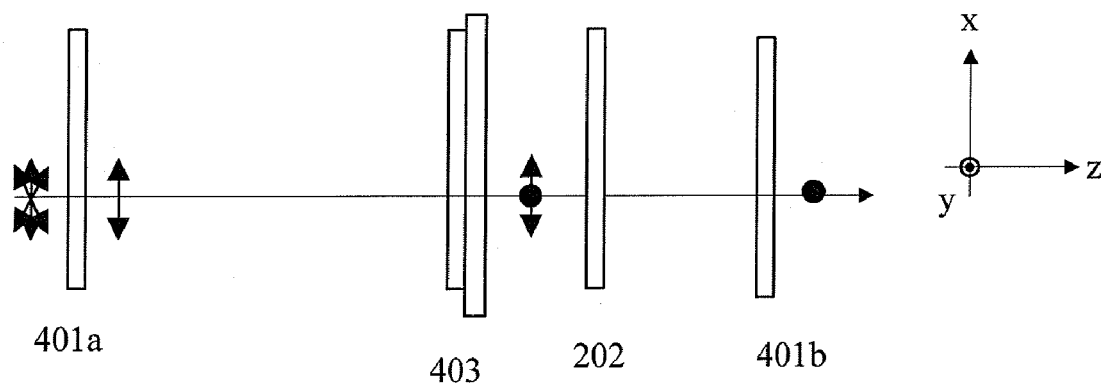
FIG. 30b is a schematic diagram of another subsystem of a multi-panel polarization-based LCD projection light engine wherein the LCD is a TN or VAN-mode transmissive liquid crystal panel.

The present invention has been described with reference to subsystems including a pre-polarizer, a WGP, a trim retarder, a VAN-mode LCoS panel, and a clean-up polarizer 204, for exemplary purposes. Those skilled in the art will recognize that changes and modifications may be made to the subsystem without departing from the scope of the present invention. For example referring to FIGS. 28, 29, 30a, and 30b, according to other embodiments, the instant invention provides an optimization technique for compensators in micro-display projection systems that use a MacNeille-type or 3M polymer-film polarization beam splitter (PBS) cube 501a rather than a WGP (wherein the coated tilted hypotenuse of the PBS gives rise to an asymmetric EMF indicatrix), and/or a twisted-nematic (TN) or VAN-mode transmissive liquid crystal panel 403 rather than a reflective LCoS panel (wherein the polarizers 401a and analyzers 401b are typically non-tilted with respect to the system XY plane, but the single-pass LCD gives rise of asymmetry in its retardance profile and thus requiring the over-value trim retarder compensator to be clocked in a particular way). Notably, those skilled in the art will recognize that the optimal range for the trim retarder SA may vary for different embodiments. For example in the embodiment illustrated in FIGS. 28 and 29, utilizing a Mac-Neille-type PBS cube, it is expected that the optimal range for the trim retarder SA will be closer to the second linear polarization (i.e., orthogonal to the incoming polarization). Accordingly, the scope of the invention is therefore intended to be limited solely by the scope of the appended claims.

The invention claimed is:

1. A liquid crystal display based projection system comprising:
   a light source;
   a first polarizer for receiving light from the light source and transmitting a first linearly polarized light having a first linear polarization axis; a liquid crystal display panel for optically modulating the first linearly polarized light, the liquid crystal display panel having a slow-axis and a fast-axis;
   a second polarizer for receiving the optically modulated light and for transmitting a second linearly polarized light having a second linear polarization axis;
   a projection lens for projecting the second linearly polarized light onto a screen; and
   a trim retarder disposed between the liquid crystal display panel and at least one of the first and second polarizers, the trim retarder having an in-plane retardance greater than a residual in-plane retardance of the liquid crystal display panel and having a slow axis, an azimuthal angle of the slow axis selected to be in an azimuthal angle range predetermined to provide a system contrast level that is substantially unaffected by at least one of an orientation of the slow axis of the liquid crystal display panel and orientations of the first and second polarizers.

2. The liquid crystal display based projection system according to claim 1, wherein the liquid crystal display panel is a transmissive liquid crystal display panel.

3. The liquid crystal display based projection system according to claim 1, wherein the liquid crystal display panel is a reflective liquid crystal display panel, the first and second linear polarization axes are orthogonal, and the first and second polarizers comprise a same polarization beamsplitter.

4. The liquid crystal display based projection system according to claim 3, wherein the polarization beamsplitter is a MacNeille-type polarization beamsplitter cube.

5. The liquid crystal display based projection system according to claim 3, wherein the polarization beamsplitter is a wire grid polarizer orientated at off-normal incidence.

6. The liquid crystal display based projection system according to claim 3, wherein the liquid-crystal display panel comprises a vertically-aligned nematic liquid crystal on silicon (VAN-LCoS) panel.

7. The liquid crystal display based projection system according to claim 5, wherein the liquid-crystal display panel comprises a vertically-aligned nematic liquid crystal on silicon (VAN-LCoS) panel.

8. The liquid crystal display based projection system according to claim 7, comprising a pre-polarizer disposed for transmitting the first linearly polarized light to a first side of the wire grid polarizer and a clean-up polarizer for receiving the second linearly polarized light reflected from a second opposite side of the wire grid polarizer.

9. The liquid crystal display based projection system according to claim 7, wherein the azimuthal angle range is predetermined to provide a substantially same system contrast level when the slow axis of the trim retarder is orientated to a first position for a first orientation of the liquid crystal display panel, to a second position for a second orientation of the liquid crystal display panel, to a third position for a third orientation of the liquid crystal display panel, and to a fourth position for a fourth orientation of the liquid crystal display panel, each of the first, second, third, and fourth orientations of the liquid crystal display panel having the slow axis of the liquid crystal display panel in a different quadrant.

10. The liquid crystal display based projection system according to claim 7, wherein the azimuthal angle range is predetermined to provide a substantially same system contrast level when the slow axis of the trim retarder is orientated in a same position for mirrored orientations of the wire grid polarizer.

11. The liquid crystal display based projection system according to claim 9, wherein the azimuthal angle is less than about 45 degrees from the first linear polarization axis.

12. The liquid crystal display based projection system according to claim 1, wherein the azimuthal angle is less than about 45 degrees from the first linear polarization axis.

13. The liquid crystal display based projection system according to claim 1, wherein the slow axis of the trim retarder is substantially parallel to the first linear polarization axis.

14. The liquid crystal display based projection system according to claim 1, wherein the azimuthal angle range is determined in dependence upon the orientation of the slow axis of the liquid crystal display panel.

15. The liquid crystal display based projection system according to claim 9, wherein the azimuthal angle range is determined in dependence upon the orientation of the slow axis of the liquid crystal display panel.

16. The liquid crystal display based projection system according to claim 15, wherein the azimuthal angle range is predetermined to provide a system contrast level that is substantially unaffected by the off-normal orientation of the wire grid polarizer.

17. The liquid crystal display based projection system according to claim 15, wherein the azimuthal angle range is in a quadrant that mirrors a quadrant containing the slow axis of the liquid crystal display panel about an axis perpendicular to the first linear polarization axis.

18. The liquid crystal display based projection system according to claim 17, wherein the trim retarder is an asymmetric trim retarder.

19. The liquid crystal display based projection system according to claim 15, wherein the trim retarder is a symmetric trim retarder, and wherein the azimuthal angle range is in one of a first quadrant that mirrors a quadrant containing the slow axis of the liquid crystal display panel about an axis perpendicular to the first linear polarization axis and a second quadrant rotated about 180.degree. from the first quadrant.

20. The liquid crystal display based projection system according to claim 5, wherein the liquid crystal display panel is one of a plurality of liquid crystal display panels, the wire grid polarizer is one of a plurality of wire grid polarizers, and the trim retarder is one of a plurality of trim retarders, and wherein the azimuthal angle of the slow axis of each trim retarder in the plurality is substantially parallel to the first linear polarization axis.

21. The liquid crystal display based projection system according to claim 5, wherein the liquid crystal display panel and the wire grid polarizer are part of a first color channel in the projection system, and wherein a second liquid crystal display panel and a second wire grid polarizer are part of a second color channel in the projection system, the wire grid polarizer being a minor image of the second wire grid polarizer, the liquid crystal display panel having a slow axis orientation substantially the same as a slow axis orientation of the second liquid crystal display panel.

22. The liquid crystal display based projection system according to claim 5, wherein the azimuthal angle range is determined using one of four calculated over-clocking angles, and wherein the azimuthal range is selected to avoid calculated over-clocking angles corresponding to system contrast levels most dependent on the off-normal orientation of the wire grid polarizer.

23. The liquid crystal display based projection system according to claim 1, wherein the azimuthal angle range is predetermined to provide a system contrast level that is substantially unaffected by the orientations of the first and second polarizers.

24. The liquid crystal display based projection system according to claim 1, wherein the azimuthal angle range is predetermined to provide a system contrast level that is substantially unaffected by the orientation of the slow axis of the liquid crystal display panel.

25. A method of clocking a trim retarder comprising:
providing a first trim retarder to compensate for residual in-plane retardance of a first liquid crystal display panel in a liquid crystal display based projection system, the liquid crystal display based projection system including:
a light source;
at least one polarizer for receiving light from the light source, for transmitting a first linearly polarized light having a first linear polarization axis to the first liquid crystal display panel, and for receiving a second linearly polarized light having a second linear polarization axis from the first liquid crystal display panel; and,
a projection lens for projecting the second linearly polarized light onto a screen, the first trim retarder having an in-plane retardance greater than a residual in-plane retardance of the first liquid crystal display panel and having a slow axis, determining a first azimuthal angle range for an azimuthal angle of the slow axis of the first trim retarder, the first azimuthal angle range selected to provide a system contrast level that is substantially unaffected by at least one of an orientation of the slow axis of the first liquid crystal display panel and an orientation of the at least one polarizer; and orientating the first trim retarder such that the azimuthal angle of its slow axis is within the first azimuthal angle range.

26. A method according to claim 25, comprising: providing a second trim retarder to compensate for residual in-plane retardance of a second liquid crystal display panel in the liquid crystal display based projection system, the second trim retarder having an in-plane retardance greater than the residual in-plane retardance of the second liquid crystal display panel and having a slow axis; determining a second azimuthal angle range for an azimuthal angle of the slow axis of the second trim retarder, the second azimuthal angle range selected to provide said system contrast level; and orientating the second trim retarder such that the azimuthal angle of its slow axis is within the second azimuthal angle range.

27. A method according to claim 25, comprising: providing a second trim retarder to compensate for residual in-plane retardance of a second liquid crystal display panel in another liquid crystal display based projection system, the second trim retarder having an in-plane retardance greater than the residual in-plane retardance of the second liquid crystal display panel and having a slow axis; determining a second azimuthal angle range for an azimuthal angle of the slow axis of the second trim retarder, the second azimuthal angle range selected to provide said system contrast level; and orientating the second trim retarder such that the azimuthal angle of its slow axis is within the second azimuthal angle range.

28. A method according to claim 25, wherein the at least one polarizer comprises a wire grid polarizer, the wire grid polarizer having a first side for receiving the light from the light source, and a second opposite side for transmitting the first linearly polarized light, for receiving the optically modulated light, and for reflecting the second linearly polarized light.

29. A method according to claim 28, wherein the first liquid-crystal display panel comprises a vertically-aligned nematic liquid crystal on silicon (VAN-LCoS) panel.

30. A method according to claim 28, wherein determining the first azimuthal angle range includes calculating four possible over-clocking angles and selecting the first azimuthal angle range to exclude over-clocking angles that provide system contrast levels most dependent on the orientation of the wire grid polarizer.

31. A method according to claim 28, wherein determining the first azimuthal angle range includes calculating four possible over-clocking angles and selecting the first azimuthal angle range to exclude over-clocking angles that provide system contrast levels most dependent the orientation of the first liquid crystal display panel.

32. A method according to claim 28, wherein determining the first azimuth angle range includes selecting the first azimuthal angle range to be between 0 and 44.degree. from the first linear polarization axis.

33. A method according to claim 27, wherein the first and second trim retarders are fabricated with substantially the same parameters.

34. A method according to claim 25, wherein determining the first azimuthal angle range includes selecting the first azimuthal angle range to provide substantially the same system contrast level for configurations having mirrored orientations of the at least one polarizer and a same liquid crystal display panel slow axis orientation.

35. A method according to claim 25, wherein determining the first azimuthal angle range includes selecting the first azimuthal angle range to provide a system contrast level that is substantially obtainable for four different slow axis quadrant orientations of the liquid crystal display panel.

* * * * *

UNITED STATES PATENT AND TRADEMARK OFFICE
CERTIFICATE OF CORRECTION

Page 1 of 1

PATENT NO. : 7,714,945 B2
APPLICATION NO. : 11/468860
DATED : May 11, 2010
INVENTOR(S) : Tan et al.

It is certified that error appears in the above-identified patent and that said Letters Patent is hereby corrected as shown below:

Col. 32, line 66, "being a minor image" should read -- being a mirror image --

Signed and Sealed this
Nineteenth Day of July, 2011

David J. Kappos
*Director of the United States Patent and Trademark Office*